(12) United States Patent
Mudra et al.

(10) Patent No.: US 12,480,586 B2
(45) Date of Patent: Nov. 25, 2025

(54) APPARATUS FOR HANDLING FLUID WITHIN AN AT LEAST PARTIALLY ELECTRICALLY DRIVEN VEHICLE

(71) Applicant: ECO Holding 1 GmbH, Marktheidenfeld (DE)

(72) Inventors: Alexander Mudra, Marktheidenfeld (DE); Sven Dehrmann, Wörth (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 240 days.

(21) Appl. No.: 17/786,095

(22) PCT Filed: Dec. 11, 2020

(86) PCT No.: PCT/EP2020/085689
§ 371 (c)(1),
(2) Date: Jun. 16, 2022

(87) PCT Pub. No.: WO2021/122354
PCT Pub. Date: Jun. 24, 2021

(65) Prior Publication Data
US 2023/0052409 A1 Feb. 16, 2023

(30) Foreign Application Priority Data
Dec. 16, 2019 (DE) .................. 102019134435.2

(51) Int. Cl.
*F16K 11/085* (2006.01)
*F16K 11/076* (2006.01)
*F16K 11/087* (2006.01)

(52) U.S. Cl.
CPC ........ *F16K 11/0856* (2013.01); *F16K 11/076* (2013.01); *F16K 11/0853* (2013.01); *F16K 11/0876* (2013.01)

(58) Field of Classification Search
CPC . F16K 11/0856; F16K 11/076; F16K 11/0853
See application file for complete search history.

(56) References Cited

U.S. PATENT DOCUMENTS 1,422,178 A * 7/1922 Cooley ............... F16K 11/0853
  251/297
2,523,521 A * 9/1950 Ritter ...................... F15B 11/20
  137/625.11

(Continued)

FOREIGN PATENT DOCUMENTS

CN 101706017 A 5/2010
CN 105473919 A 4/2016

(Continued)

OTHER PUBLICATIONS

International Search Report (With English Translation) and Written Opinion (with Machine Translation) issued on Aug. 2, 2021 in corresponding International Application No. PCT/EP2020/085689; 29 pages.

(Continued)

*Primary Examiner* — Umashankar Venkatesan
(74) *Attorney, Agent, or Firm* — Maier & Maier, PLLC

(57) ABSTRACT

An apparatus for handling fluid within an at least partially electrically powered vehicle, including: a valve device with a valve housing, the valve housing includes at least eight radially arranged port openings for fluid to flow in or out, a valve body, which is arranged inside the valve housing and is rotatable about an axis of rotation R, and the valve body includes at least four connecting channels for fluidly connecting two port openings, respectively.

14 Claims, 11 Drawing Sheets

(56) References Cited

U.S. PATENT DOCUMENTS

| | | | |
|---|---|---|---|
| 4,506,697 A | 3/1985 | Marchant | |
| 4,574,842 A * | 3/1986 | Cordova | F16K 11/0856 137/625.46 |
| 4,586,581 A | 5/1986 | Shibahata et al. | |
| 4,665,946 A | 5/1987 | Hulsey | |
| 5,172,725 A | 12/1992 | Kitagawa | |
| 2005/0241703 A1 * | 11/2005 | Takacs | F16K 11/076 137/625.46 |
| 2006/0118066 A1 * | 6/2006 | Martins | F16K 11/0856 123/41.08 |
| 2010/0319796 A1 * | 12/2010 | Whitaker | F16K 11/085 137/625.46 |
| 2011/0319836 A1 | 12/2011 | Lee | |
| 2012/0198881 A1 | 8/2012 | Burk | |
| 2014/0076454 A1 * | 3/2014 | Kjar | B65B 3/28 141/83 |
| 2017/0152957 A1 * | 6/2017 | Roche | B60L 58/26 |
| 2018/0292016 A1 * | 10/2018 | Ledvora | F16K 5/0471 |
| 2019/0070924 A1 * | 3/2019 | Mancini | B60H 1/32281 |
| 2019/0211738 A1 | 7/2019 | Yoshimura et al. | |
| 2022/0221204 A1 * | 7/2022 | Miyazaki | F16K 11/0856 |
| 2022/0316608 A1 * | 10/2022 | Tiemeyer | F16K 27/065 |
| 2023/0407980 A1 * | 12/2023 | Wang | B60K 11/02 |

FOREIGN PATENT DOCUMENTS

| | | |
|---|---|---|
| CN | 104265952 B | 8/2016 |
| CN | 106051183 A | 10/2016 |
| CN | 108361430 A | 8/2018 |
| CN | 208565705 U | 3/2019 |
| CN | 110374955 A | 10/2019 |
| DE | 102015000424 B3 | 4/2016 |
| DE | 112014003423 T5 | 5/2016 |
| DE | 102017011004 A1 | 5/2019 |
| DE | 102018102542 A1 | 8/2019 |
| EP | 3051191 A1 | 8/2016 |
| FR | 2949527 A1 | 3/2011 |
| GB | 895749 A | 5/1962 |
| GB | 960487 A | 6/1964 |
| JP | H694336 A | 4/1994 |
| WO | 2017223232 A2 | 12/2017 |
| WO | 2019206741 A1 | 10/2019 |

OTHER PUBLICATIONS

Office Action issued on Jan. 22, 2025, in corresponding European Application No. 20829764.8, 16 pages.

Office Action issued on Jan. 23, 2025, in corresponding Chinese Application No. 202080094581.3, 19 pages.

Office Action issued on Mar. 25, 2025, in corresponding Chinese Application No. 202080094600.2, 21 pages.

Zhang, "Hydraulic Transmission and Control", Northwestern Polytechnical University Press, Apr. 30, 2014, pp. 253-258, with partial English translation.

* cited by examiner

APPARATUS FOR HANDLING FLUID WITHIN AN AT LEAST PARTIALLY ELECTRICALLY DRIVEN VEHICLE

FIELD

The invention relates to an apparatus for handling fluid within an at least partially electrically driven vehicle.

SUMMARY

Such apparatuses are also known in the prior art as energy optimization modules or thermal management apparatuses. The thermal management apparatus essentially fulfills the task of optimizing the thermal energy balance in the motor vehicle with the aim of reducing fuel consumption and emissions, ensuring engine cooling at every operating point and optimizing interior comfort. The aim is to optimally conduct heat flows such as heat supply and heat dissipation in the combustion engine, gearboxes or passenger compartment in order to reduce energy consumption and increase interior comfort. Heat is transported from one body to another by means of a heat transfer medium such as coolant or air, usually by forced convection. Heat is transferred from one fluid to another fluid via heat exchangers such as radiators, charge air coolers, EGR coolers or air conditioning condensers. The mass flows of the fluids are maintained in particular by pumps. A sufficient cooling air mass flow is often ensured by the airstream, so that many vehicles are equipped with electrically driven radiator fans, if the airstream is not sufficient.

Such thermal management modules are sufficiently known in the prior art. For example, an integrated coolant bottle arrangement is known from WO 2017/223232 A2. The coolant bottle arrangement includes a container configured for use in a thermal system. Examples of such thermal systems include a cooling/heating system of a battery-powered electric vehicle, electric power generators (e.g., engine-based systems), other physical plant installations, etc. Such a reservoir includes a first section and a second section. The second section is connected with the first section at a storage interface to form the reservoir configured to store and/or flow a fluid medium. The first section can include an integral channel that provides a pathway for flow of the fluid medium. The reservoir may also include a component interface configured to facilitate connection of a component thereto. Such components include, for example, a pump, a battery pump, a drivetrain pump, a chiller, a heater, a filter, an aerator, a valve, a connector, a fan, or a cooler.

Furthermore, an apparatus for handling at least one fluid within a vehicle, in particular an at least partially electrically driven vehicle, is known from DE 10 2018 102 542 A1. The apparatus comprises at least one substantially plate-shaped first distribution element and at least one second distribution element arranged substantially parallel to the first distribution element, wherein the first distribution element and/or the second distribution element comprises at least one fluid handling element at least in some areas, and wherein the first distribution element and the second distribution element comprising plastic at least in some areas, and a method for producing an apparatus for handling at least one fluid, in particular at least one apparatus according to the invention.

The problem with known thermal management modules is that some of the individual components are arranged decentrally in a motor vehicle and are connected to each other via connecting hoses, cables and control units. As a consequence, the connecting hoses, cables and control units are sometimes distributed over long distances and the assembly effort is high. There is also a high risk of leakage and short circuits, which affects the reliability and repair susceptibility of the entire thermal management module. In addition, there is the problem that, for example, pressure and voltage losses frequently occur due to leaks. This problem is also exacerbated by long cable lengths or corrosion.

There is also a particular need to reduce leakage at interfaces and fluid valves. This is based on the fact that leakages at valves are caused in particular by pressure differences upstream and downstream of a valve. Consequently, the risk of leakage can be reduced by preventing pressure differences as far as possible.

Furthermore, there is a need to configure the valve devices used in the apparatus for handling fluid as compactly as possible. In particular, it would be desirable here that the valve device could handle multiple fluid streams.

SUMMARY

The invention is therefore based on the task of specifying a thermal management module that overcomes the problems from the prior art.

The solution according to the invention is to provide an apparatus for handling fluid of an at least partially electrically driven vehicle, with a valve device comprising a valve housing, wherein the valve housing comprises at least eight radially arranged port openings for the inflow or outflow of fluid, a valve body which is arranged within the valve housing and rotatable about an axis of rotation R, wherein the valve body comprises at least four connecting channels for fluidly connecting two port openings, respectively. The advantage of the apparatus according to the invention is in particular the special compactness of the valve device. With a single valve body, the valve device is suitable for connecting a plurality of port openings, in particular at least eight radially arranged port openings, with each other in different switching positions. For example, the valve device according to the invention can connect the eight radial port openings in eight different switching positions. This means that a single valve device according to the invention can fulfill the functions of several valves—for example, two 4/2-way valves or three 3/2-way valves—without any restrictions. It is also advantageous that with a single valve body, only a single actuator is required to control the valve device. The actuator acts on the axis of rotation R about which the valve body is configured to rotate. The compact construction of the valve device according to the invention can be accommodated in a vehicle in a space-saving manner Thus, the apparatus is particularly suitable for use in apparatuses which have to handle several fluid streams centrally.

A fluid in the sense of the present invention can be understood as any form of cooling water, coolant or refrigerant. For example, glycol or a glycol mixture is added to the water-based fluid to lower the freezing point of the fluid. Alternatively, the fluid may be oil-based to eliminate the electrical conductivity of the fluid. This brings the additional advantage that electrical cells can be directly can be cooled directly.

According to an advantageous further development of this embodiment, the valve body is configured to be transferable between at least four different switching positions. In particular, the valve body is preferably transferable between at least eight different switching positions. In this way, the valve body can replace two 4/2-way valves connected in parallel as a more compact and easier to integrate component.

According to an advantageous further embodiment of the invention, a further port opening is arranged between two port openings that are respectively fluidically connected to each other. The arrangement of a further port opening between two fluidically connected or connectable port openings provides several advantages. Firstly, this facilitates the arrangement of the port openings in one plane. Furthermore, the degree of curvature of the flow channel connecting the two fluidically connected port openings can then be designed more optimally from a fluidic point of view. In particular, this is not so narrow that strong turbulence occurs. This reduces the pressure difference of the fluid upstream and downstream of the valve body. Furthermore, it is advantageous that the valve device can be switched over with a small angular movement of the valve body, so that the valve device is suitable for very fast switching operations.

According to a further advantageous embodiment, the radially arranged port openings each comprise the same distance from each other. This enables particularly simple control of the actuator by a stepper motor. In addition, this significantly simplifies the connection of the individual fluid lines to the port openings, since sufficient installation space is available.

According to a preferred embodiment, the port openings are located in a common port plane, wherein the axis of rotation is configured orthogonal to the port plane. This enables a particularly flat design of the valve device. In particular, this improves flexibility and integration of the apparatus into a vehicle.

According to an additional embodiment, the valve body comprises a dividing wall which is configured to be parallel to the axis of rotation. Particularly preferred, the axis of rotation can be located in the plane formed by the dividing wall. The dividing wall makes the valve body particularly easy to manufacture. In particular, the valve body can be manufactured cost-effectively by an injection molding process. The partition wall improves the demoldability of the cured valve body from the mold. Here, an easy detachment in one direction is possible. The dividing wall runs completely through the valve body. Here, the dividing wall separates two of the connecting channels from the two other connecting channels. This means that two connecting channels are arranged on one side of the dividing wall and two connecting channels are arranged on the other side of the dividing wall.

According to an advantageous embodiment, the valve body comprises a dividing plane which divides the valve body into a lower portion and an upper portion, wherein the dividing wall and the dividing plane at least partially define the four connecting channels. The dividing plane is also configured to improve the demoldability of the cured valve body from the mold. The dividing plane runs completely through the valve body. Here, the dividing plane separates two of the connecting channels from the two other connecting channels. This means that two connecting channels are arranged in the lower portion and two connecting channels are arranged in the upper portion.

In an advantageous further development of this embodiment, the dividing plane comprises an angle of inclination $\alpha$ greater than 0° relative to the port plane. This provides the technical advantage, for example, that the flow through the arcuate shape of the connecting channels is as low in resistance as possible. Due to the angle of inclination the connecting channels do not directly restrict each other. This means that each connecting channel can be aligned without protrusions and without flow-causing edges. This in turn significantly reduces the pressure differences of the fluid upstream and downstream of the connecting channel.

In another advantageous further development of this embodiment, the angle of inclination $\alpha$ is smaller than 45°, in particular smaller than 30°, in particular smaller than 15°, in particular smaller than 5°. In this way, sufficient account can be taken of the specific conditions. For example, the concrete inclination of the first inclination angle $\alpha$ depends on the diameter of the valve body and the diameter of the connecting channels. The inclination angle $\alpha$ does not have to be constant along the dividing plane. The dividing plane can therefore comprise one or more curvatures. This also leads to the fact that individual sections of the dividing plane can comprise different angles of inclination $\alpha$. However, the angles in the individual sections of the dividing plane are within the angular ranges introduced above. Particularly preferred, the dividing plane is configured axis-symmetrically at the axis of rotation R. This means that there is a further point P' of the dividing plane for each point P of the dividing plane, so that the connecting path PP' is bisected at right angles by the axis of rotation R.

According to an advantageous further embodiment, the upper portion and the lower portion are each configured as a 4/2-way valve. This means that two connecting channels extend in each of the portions, wherein one of the connecting channels extends on one side of the dividing wall and the other connecting channel extends exclusively on the other side of the dividing wall. The valve device is thus able to fulfill the functions of two 4/2-way valves with one compactly designed valve body without restriction. Due to its compact design, the valve device according to the invention can be accommodated in the vehicle in a particularly space-saving manner Thus, the apparatus as a whole is particularly suitable for use in devices that have to handle several fluid flows centrally.

Particularly preferred, the dividing plane comprises a first subplane and a second subplane, wherein the first subplane extends on one side of the dividing wall and the second subplane extends on the other side of the dividing wall. The two subplanes are thus separated by the dividing wall. The first subplane and the second subplane are configured symmetrically to each other. Consequently, the subplanes can comprise symmetrical angles of inclination to each other.

In a special embodiment, a wet-running gearbox is associated with the valve device. This provides the technical advantage, for example, that the torque generated at the rotor can be adapted to the required function in each case. For example, different stages can be used for transmission. The gearbox can be arranged directly in the fluid and thus in the second housing section. Thereby, no dynamic seals are required. The potentially necessary lubrication can be provided directly via the cooling fluid and any heat loss due to friction is dissipated directly into the cooling fluid.

In a particularly preferred embodiment, the apparatus comprises an apparatus housing with a first housing section and a second housing section, wherein the first housing section and the second housing section are configured adjacent to each other by a fluidically impermeable contour wall, wherein the contour wall comprises a side oriented towards the first housing section and a side oriented towards the second housing section, at least one fluid handling element, wherein the fluid handling element comprises a means for generating a controllably variable magnetic field, which is arranged in the first housing section, and a means in the form of the valve device, which is movable by the generated magnetic field and which is arranged in the second housing section. This results, for example, in the technical advantage that there is only a magnetic coupling between the means for generating a controllably variable magnetic field and the means in the form of the valve device which can be moved by the generated magnetic field. This magnetic coupling acts through the fluidically impermeable contour wall and enables the means movable by the generated magnetic field to be arranged wet-running in the fluid in the second housing section. The means for generating a controllably variable magnetic field, on the other hand, is arranged together with the control unit in the "hydraulically decoupled", dry first housing section. The separation between the water-carrying second housing section and the electronics in the first housing section reduces the risk of leakage and short circuits. In addition, it is not necessary to use dynamic seals. This means that no heat is lost through friction and energy efficiency increases. Overall, a higher degree of efficiency can be provided. The valve device can thus be arranged completely in the second housing section.

According to an advantageous embodiment, the means for generating a controllably variable magnetic field comprises a stator and the means movable by the generated magnetic field comprises a rotor. Due to the rotor-stator arrangement, a torque can be generated through the fluidically impermeable contour wall by means of the magnetic coupling. Alternatively, the fluid handling element may comprise, for example, an electric motor, a coil arrangement or a switching magnet as means for generating a controllably variable magnetic field, which is arranged in the first housing section.

According to a further embodiment, the contour wall comprises at least two cylindrical protrusions, each of which at least substantially fills an interior space of a stator arranged in the first housing section. This provides, for example, the technical advantage that the contour wall specifies the exact installation position of the respective stator through each of its protrusions. The contour wall thus has a dual function. On the one hand, the fluidic impermeability essential to the invention and, on the other hand, the positioning of the stators in the first housing section.

In addition, the contour wall serves to center the rotor in the stator. According to a still further embodiment, the cylindrical protrusion is configured to receive a rotor arranged in the second housing section. This provides, for example, the additional advantage that a rotor arranged in the second housing section is optimally oriented with respect to the stator. In addition, the cylindrical protrusion can serve as a guide for the rotor during operation, wherein fluidic impermeability is not restricted and the separation between the water-carrying second housing section and the electronics in the first housing section remains ensured.

In an advantageous embodiment, the apparatus comprises a second fluid handling element, which comprises a fluid pump. This can provide the technical advantage, for example, that a fluid circuit can be operated by the fluid pump.

According to a special embodiment, the rotor axes of the fluid handling elements are arranged parallel to each other. Thereby the special advantage is achieved that the manufacturing and the assembly in this arrangement are particularly simple. In addition, individual assemblies can be easily tested and replaced.

Another aspect is to provide an apparatus for handling fluid within an at least partially electrically powered vehicle, wherein the apparatus comprises an apparatus housing, a first housing section, and a second housing section, wherein the first housing section and the second housing section are configured adjacent to each other by a fluidically impermeable contour wall. Further, the contour wall comprises a side oriented toward the first housing section, a side oriented toward the second housing section, and at least one fluid handling element, wherein the fluid handling element comprises means for generating a controllably variable magnetic field arranged in the first housing section and means movable by the generated magnetic field arranged in the second housing section.

This results, for example, in the technical advantage that there is only a magnetic coupling between the means for generating a controllably variable magnetic field and the means movable by the generated magnetic field. This magnetic coupling acts through the fluidically impermeable contour wall and allows the means movable by the generated magnetic field to be arranged wet-running in the fluid in the second housing section. The means for generating a controllably variable magnetic field, on the other hand, is arranged together with the control unit in the "hydraulically decoupled", dry first housing section. The separation between the water-bearing second housing section and the electronics in the first housing section reduces the risk of leakage and short circuits. In addition, it is not necessary to use dynamic seals. As a result, there is no heat loss due to friction and the energy efficiency increases. Overall, a higher efficiency can be achieved as a result.

A fluidically impermeable contour wall in the sense of the invention is to be understood as a continuous separating layer which is configured continuously without interruptions at least between the means for generating a controllably variable magnetic field and the means which is movable by the generated magnetic field. In this context, fluidically impermeable means that no fluid exchange can take place through the contour wall. The fluidically impermeable contour wall can, for example, be limited to one fluid handling element. Alternatively, the contour wall can also be understood as a continuous separating layer for accommodating several fluid handling elements. Contrary to known elastomer-based elastically deformable seals, leakage due to flow around the contour wall does not occur. The impermeable contour wall is understood to be like a continuous shell surface. For example, the continuous interface may also be the surface of a plastic body which carries internally the means which is movable by the generated magnetic field and which is controllable by the means for generating a controllably variable magnetic field from the outer surface of the plastic body.

Means for generating a controllably variable magnetic field can be understood as any means suitable for generating a magnetic field with the aid of electric current. The magnetic field is configured to be controllable by the supply of current, which in the simplest case means at least switching the magnetic field on and off. However, it is also possible to vary the strength of the magnetic field between switching on and off. For example, electric coil arrangements, electric magnets, stepper motors, switching magnets, brushless motors, claw motors or electric linear actuators are conceivable as such means.

On the other hand, permanent magnets, ferromagnetic bodies or bodies with materials based on rare earths are conceivable as means that can be moved by the generated magnetic field.

According to an advantageous further embodiment of the invention, the means for generating a controllably variable magnetic field comprises a stator and the means movable by the generated magnetic field comprises a rotor. Due to the rotor-stator arrangement, a torque can be generated through the fluidically impermeable contour wall by means of the magnetic coupling. Alternatively, the fluid handling element may comprise, for example, an electric motor, a coil arrangement or a switching magnet as means for generating a controllably variable magnetic field, which is arranged in the first housing section.

According to a further embodiment, the contour wall comprises a cylindrical protrusion which at least substantially fills an interior of a stator arranged in the first housing section.

This has the technical advantage, for example, that the cylindrical protrusion of the contour wall determines the exact installation position of the stator. The contour wall thus has a dual function. On the one hand, the fluidic impermeability essential to the invention and, on the other hand, the positioning of the stator in the first housing section.

According to a still further embodiment, the cylindrical protrusion is configured to receive a rotor arranged in the second housing section. This has the additional advantage, for example, that a rotor arranged in the second housing section is optimally oriented with respect to the stator. In addition, the cylindrical protrusion can serve as a guide for the rotor during operation, wherein fluidic impermeability is not restricted and separation between the water-carrying second housing section and the electronics in the first housing section remains ensured.

According to a further advantageous embodiment, the second housing section is configured to carry fluid and comprises at least one connection for the inflow and/or outflow of fluid. This has the technical advantage, for example, that the second housing section can be designed without electrical interfaces. The focus is only on the supply, the diversion and the discharge of fluid, wherein the manufacture of the second housing section is characterized by inexpensive material selection and the suitable joining method. For example, the second housing section can be manufactured by means of vibration welding or mirror welding, which would be problematic in connection with the electronic control unit for thermal reasons and can therefore only be implemented separately. It is also possible to realize several ports for the inflow and/or outflow of fluid. The ports represent the customer interface. The hose diameter, number and corresponding positions of the ports can be varied. Depending on customer requirements, the direction of the ports can also be adapted, wherein variable adjustability of the ports would also be conceivable.

In order to adapt the entire apparatus as flexibly as possible to specific customer requirements, each fluid handling element can be assigned a different function in the apparatus. For this purpose, the fluid handling element comprises a fluid pump or fluid valve. Depending on the intended use, the embodiment of a fluid handling element is thus implemented, wherein in each embodiment the magnetic coupling remains in connection with the fluidically impermeable contour wall and the means movable by the generated magnetic field is arranged wet-running in the fluid in the second housing section.

According to a preferred embodiment, the rotor is associated with a means for conveying and/or controlling fluid. Due to the magnetic coupling between stator and rotor, a magnet arranged on the rotor is set in rotation by the stator. Additionally, different means can be arranged on the rotor itself, which depend on the desired function of the respective fluid handling element. For example, a pump with impeller or with running wheel can be used for pumping a fluid. For controlling or diverting the fluid, for example, a rotary valve or a switching valve can be used.

According to an alternative embodiment, the means comprises a switching element. This allows, for example, the technical advantage that the switching element can be configured as a rotary slide valve. This makes the apparatus or the fluid handling element adaptable to different vehicles and different functions. Different installation spaces and different requirements on the part of a vehicle manufacturer make different switching strategies necessary. For example, fluid can be diverted by a rotary slide valve and a variety of ports and switching modes can be realized.

According to an alternative embodiment, the means comprises a running wheel. This has the technical advantage, for example, that the running wheel can be integrated directly into a fluid circuit. Through the stator-rotor connection, a pump function can thus be realized from the rotation. For example, the running wheel is configured as an impeller.

According to an additional embodiment, a wet-running gearbox is associated with the rotor. This provides the technical advantage, for example, that the torque generated at the rotor can be torque generated at the rotor can be adapted to the required function. For example, different stages can be used for transmission. The gearbox can be arranged directly in the fluid and thus in the second housing section. This eliminates the need for dynamic seals. The potentially necessary lubrication can be provided directly by the cooling water, and any heat loss due to friction through friction is dissipated directly into the cooling fluid. Alternatively to this embodiment, it is also possible to operate the rotor without a wet-running gearbox. For example, the rotor can be sealed against the fluid by means of a seal. Consequently, the rotor can be operated dry.

In a particular embodiment, an electrical control unit is associated with the first housing section for controlling the apparatus. The electrical control unit is necessary for the operation of the apparatus and can be arranged either outside the first housing section or inside the first housing section. It is also conceivable to operate the apparatus with an external control unit provided by the customer, wherein an interface can be provided on the first housing section for this purpose. Alternatively or additionally, however, the control unit can be arranged within the first housing section.

Based on this, the electrical control unit is arranged within the first housing section adjacent to the fluidically impermeable contour wall. For example, the technical advantage can be provided that by placing the electrical control unit against the fluidically impermeable contour wall within the first housing section, the electrical control unit can be effectively cooled. This cooling also occurs without a risk of direct contact with the fluid, thus avoiding short circuits. Additionally, fluid can be heated with dissipated heat. Another advantage is that the low coolant temperature has a large temperature difference from the chip temperature of the power electronics. For example, a temperature sensor could be arranged on the side of the electrical control unit—that is, in the dry area—to measure the fluid temperature. The sensor would thus measure through the fluid impermeable contour wall, wherein the evaluation of the sensor signal can take place directly in the dry area of the first housing section.

According to a further embodiment, the apparatus comprises a second fluid handling element, which comprises a fluid pump. Thereby, for example, the technical advantage can be provided that an additional fluid circuit can be controlled by the second fluid pump.

In a particularly preferred embodiment, the apparatus comprises a third fluid handling element which comprises a fluid valve. The fluid valve has the function of a rotary slide valve. The rotary valve makes the apparatus adaptable to different vehicles, wherein different installation spaces and different requirements may, for example, make it necessary to divert the fluid. By switching interfaces, it is possible to switch from parallel circuits to serial circuits.

According to a specific embodiment, the fluid valve comprises a double rotary slide arrangement with a first level and a second level. This results, for example, in the technical advantage that two switching positions can be arranged and operated simultaneously in one rotary valve with only one fluid handling element. For example, there is no need for a further fluid handling element, since two switching positions can be controlled with only one rotor-stator arrangement. For example, it may be necessary to supply fluid to different installation spaces on different vehicles. To avoid having to replace the entire fluid handling element, the different levels of the rotary valve assembly can be used. Thus, depending on the desired purpose, different fluid channels are interconnected without changing the entire fluid handling element. For example, a first level may include a valve position that allows 90° diversion, while a second level may include a valve position that allows 180° diversion, i.e. straight ahead. By appropriately utilizing the associated ports of the rotary valve assembly in either the first or second plane, the desired function is realized.

According to another embodiment, the apparatus comprises an expansion valve for an associated heat exchanger. This provides, for example, the technical advantage that a heat exchanger can also be integrated into the apparatus and the control of the expansion valve can be performed in a similar manner with the other fluid handling elements of the apparatus. There is an additional simplification of the manufacture and assembly of the apparatus.

Based on this, the heat exchanger includes an associated heating apparatus. The heating apparatus can preferably be integrated into the heat exchanger, so that a fluid can be heated directly, and which can then be used to heat the battery, engine or vehicle interior. The heat exchanger, also referred to as a chiller, would thus have the ability to actively heat or cool.

Such heat exchangers are usually brazed from stacked sheets. The plates are brazed in such a way that one channel of a first fluid is always alternately in thermal contact with a channel of a second fluid. Due to the large contact area, heat can be transferred optimally. For example, the thermoforming sleeve can be brazed into a package of stacked metal sheets, which can then be filled with heating wire and insulating ceramic similar to a conventional heating cartridge. For example, the heating apparatus could also be operated inductively, wherein an inductively heatable body is inserted and heated via a circulating induction coil. It would also be conceivable to use a combined control unit, which would save additional cables, and which would simplify module integration. Overall, such a heat exchanger heat exchanger saves additional hose connections and makes the apparatus more compact.

According to a further embodiment, the first housing section comprises a removable first cover element. This provides, for example, the technical advantage that the dry area and the components of the electronics in the apparatus can be accessed directly for repair purposes. Inspections or repairs are thus significantly simplified.

According to an additional embodiment, the second housing section comprises a removable second cover element. This also provides the technical advantage that all wet-running components of the device can be accessed directly for repair purposes. Inspections or repairs are also considerably simplified.

According to a particularly preferred embodiment, the apparatus comprises a first fluid circuit associated with the first fluid handling element and a second fluid circuit associated with the second fluid handling element. This makes the apparatus particularly easy to operate. In combination with the double rotary slide valve arrangement, it would be possible, for example, to operate a total of four fluid circuits with two fluid handling elements, each with two switching positions in a rotary slide valve. In combination with a serial or a parallel arrangement, additional functionalities can be provided.

According to a special embodiment, the rotor axes of the fluid handling elements are arranged parallel to each other. This provides the particular advantage that production and assembly in this arrangement are especially simple. In addition, individual assemblies can be easily tested and replaced.

In order to improve the flexibility and integration of the apparatus into a vehicle the ports for inflow and/or outflow of fluid are arranged in a plane which is approximately orthogonal to the orientation of the rotor axes of the fluid handling elements.

The invention is explained in more detail below by way of a description of examples of embodiments with reference to the accompanying drawings. Further advantageous embodiments and combinations of features of the invention result from the following description and the totality of the patent claims.

BRIEF DESCRIPTION OF THE DRAWINGS

The drawings used to explain the embodiments are shown in.

DETAILED DESCRIPTION

Figure 1:
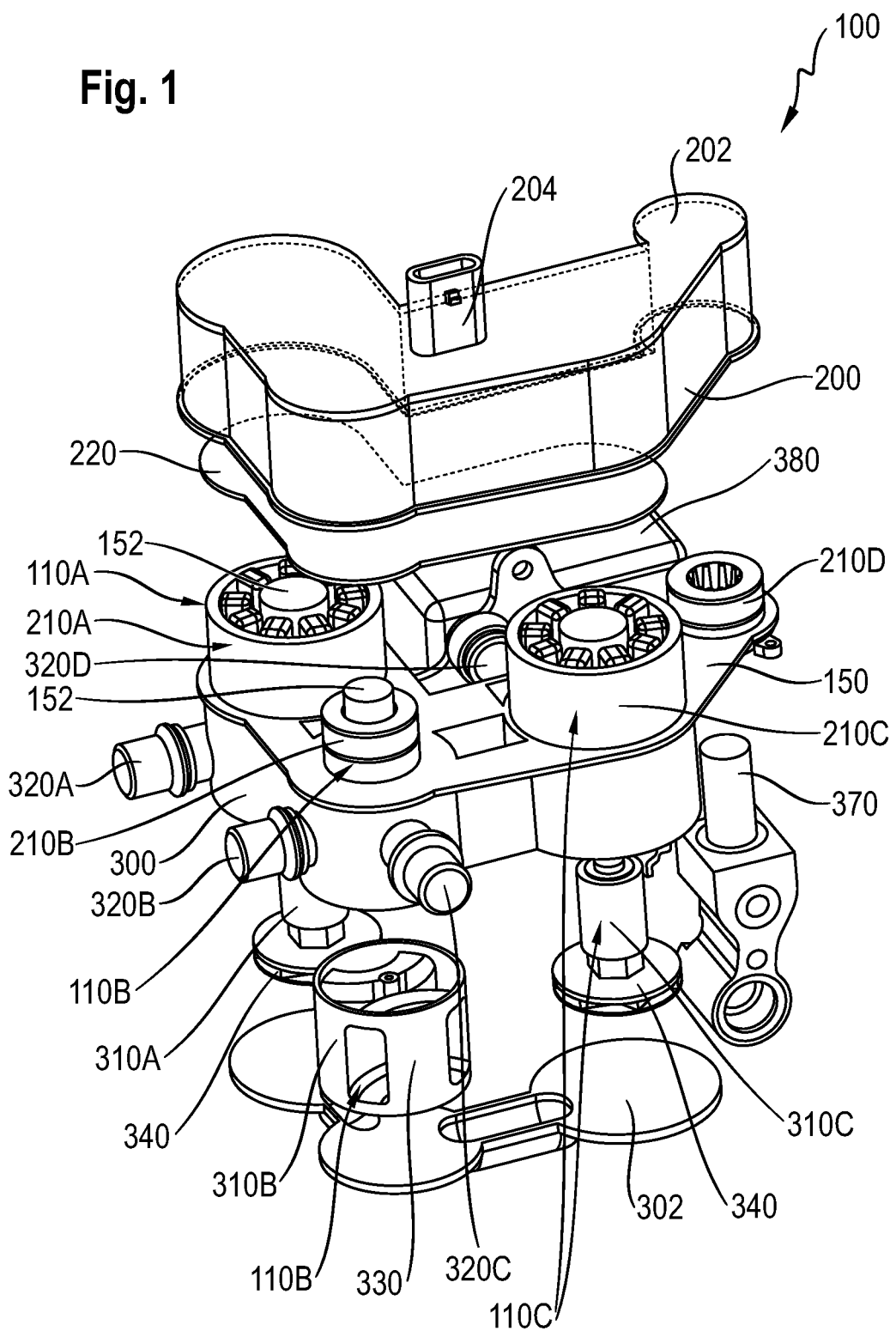
FIG. 1 an exploded view of an apparatus for handling a fluid in accordance with a first embodiment.

FIG. 1 shows an exploded view of an apparatus 100 according to the invention for handling a fluid according to a first embodiment. The apparatus 100 is intended for use in an at least partially electrically operated vehicle. Thus, it can be used in purely electrically operated vehicles as well as in hybrid vehicles.

The apparatus 100 includes a first housing section 200 and a second housing section 300, wherein the first housing section 200 and the second housing section 300 are configured to be adjacent to each other by a fluidically impermeable contour wall 150. The contour wall 150 is configured as a single piece. In this embodiment, the contour wall 150 is also the outer wall of the second housing section 300, whereby the outer wall is identical with the side of the second housing section 300 oriented toward the first housing section 200.

On the side facing the first housing section 200, the contour wall 150 comprises a number of cylindrical protrusions 152. Applied to these cylindrical protrusions 152 are means (210A, 210B, 210C) for generating a controllably variable magnetic field in the form of stators. The cylindrical protrusions 152 project into the interior of each arranged stator and fill this interior in such a way that hollow cylinders are configured on the side of the second housing section 300 into which the means 310A, 310B, 310C, which are designed to be movable by the generated magnetic field, can be inserted. The means 210A, 210B, 210C, 210D for generating a controllably variable magnetic field are configured as stators of stepper motors in the present embodiment, but they can also be configured as ordinary motors, brushless DC motors such as claw motors or solenoid valves.

On a side (not shown) of the contour wall 150 oriented towards the second housing section 300, there are means 310A, 310B, 310C, which are configured to be movable by the generated magnetic field of the respective associated means 210A, 210B, 210C for generating a controllably variable magnetic field. The means 310A, 310B, 310C, which are configured to be movable by the generated magnetic field, each comprise a rotor with an associated magnet. The rotor is caused to rotate by the stator, whereby the means 310A, 310B, 310C, which are configured to be movable by the magnetic field, are controllable by the stator. The means 310A, 310B, 310C, which are movable by the generated magnetic field, are respectively associated with means for conveying and/or controlling fluid. For example, the stator of the means 210B for generating a controllably variable magnetic field is associated with a switching element 330, which is configured as a rotary slide. Due to the rotary slide valve, different installation spaces and different requirements can be realized with different circuit strategies. Fluid can be diverted and different ports and switching modes can be combined.

The stators of the means 210A, 210C for generating a controllably variable magnetic field are each associated with a running wheel 340. The running wheel is configured, for example, as an impeller and is integrated directly into a fluid circuit within the second housing section 300. A torque is generated by the stator via the magnetic coupling to the rotor, which leads to a rotation of the impeller. Thus, the impeller can be used as a pump of the respective associated fluid circuit.

The rotors associated with the means 310A, 310B, 310C, which are configured to be movable by the magnetic field, are respectively placed in the cylindrical protrusions 152 of the contour wall 150 in the second housing section 300. In other words, the cylindrical protrusion 152 enables both the precise arrangement of a stator in the first housing section 200 and the precise arrangement of a rotor in the second housing section 300, thereby realizing a precise association between the rotor and the stator. In other words, the cylindrical protrusion 152 enables both the precise arrangement of a stator in the first housing section 200 and the precise arrangement of a rotor in the second housing section 300, thereby realizing a precise association between the rotor and the stator. The cylindrical protrusion thus fulfills the dual function of the assignment of rotor and stator on the one hand and the fluid-tight separation between first housing section 200 and second housing section 300, which can be referred to as hydraulic decoupling.

The combination of means 210A, 210B, 210C for generating a controllably variable magnetic field in the form of a stator, which are arranged in the dry first housing section 200, the respective associated means 310A, 310B, 310C, which is movable by the generated magnetic field, which is arranged in the wet second housing section 300, and which is operable across the contour wall 152 by a magnetic coupling, each describe a fluid handling element 110A, 110B, 110C.

One exception is the means 210D for generating a controllably variable magnetic field in the form of a stepper motor. This is arranged in the dry first housing section 200. However, an expansion valve 370 is associated with the stepper motor. In contrast to the fluid handling elements 110A, 110B, 110C already described no continuous fluid-impermeable contour wall 150 exists between the means 210D for generating a controllably variable magnetic field and the means which is movable by the generated magnetic field. The latter is integrated into the housing of the expansion valve 370 and the expansion valve 370 is merely arranged parallel to the other fluid handling elements 110A, 110B, 110C on the housing section of the apparatus 100, wherein the stepper motor is integrated into the dry area of the first housing section 200. In order to seal the necessary opening in the fluid impermeable contour wall 150 for passing the expansion valve 370 therethrough, it is recommended to arrange an O-ring.

Overall, in the present embodiment, the apparatus 100 includes a first fluid handling element 110A, which is configured as a fluid pump. In addition, the apparatus 100 comprises a second fluid handling element 110C, which also comprises a fluid pump. This allows two separate fluid circuits to be operated or allows fluid to be conveyed from two separate fluid circuits. Additionally, the apparatus 100 comprises a third fluid handling element 110B, which comprises a switching element 330 or a fluid valve. The fluid valve is configured with a rotary slide valve, and the rotary slide valve makes the apparatus 100 adaptable to different vehicles. Different installation spaces and different requirements of the vehicle can be realized, for example, by diverting the fluid. By switching the rotary slide valve, it is possible to switch from parallel fluid circuits to serial fluid circuits. Additionally, proportional mixing ratios can be provided. Additionally, the apparatus 100 includes means 210D for generating a controllably variable magnetic field in the form of a stepper motor, wherein the expansion valve 370 is associated therewith for operating a heat exchanger 380.

All of the fluid handling elements (110A, 110B, 110C) are arranged on the apparatus 100 such that the rotor axes (not shown) of the fluid handling elements 110A, 110B, 110C are arranged parallel to each other. This significantly simplifies fabrication and assembly of the entire apparatus 100, wherein additionally individual assemblies can be easily tested and replaced.

A plurality of ports 320A, 320B, 320C, 320D are arranged on the second housing section 300 for fluid inflow and/or outflow. The ports serve as customer interfaces and can be varied in terms of tubing diameter and corresponding positions as required. The present embodiment includes a total of four ports 320A, 320B, 320C, 320D which discharge fluid laterally from the second housing section 300 and introduce fluid laterally into the second housing section 300, respectively. One port 320D serves as a connection with a heat exchanger 380. The heat exchanger 380 is associated with the means 210D for generating a controllably variable magnetic field in the form of the stepper motor in the dry first housing section 200. The heat exchanger 380 is also associated with the expansion valve 370.

The apparatus 100 further comprises an electrical control unit 220, which is also arranged in the dry first housing section 200. The electrical control unit 220 is configured as a flat body, as it is usual, for example, for control boards or the like. The control unit 220 is arranged above the means in the form of stators for generating a controllably variable magnetic field 210A, 210B, 210C, 210D. The electrical control unit 220 is necessary for controlling the apparatus 100. For example, the control unit 220 could also be arranged between the individual stators within the first housing section 200, but immediately adjacent to the fluidically impermeable contour wall 150. This would be advantageous as the electrical control unit 220 could be additionally cooled without risking direct contact with the fluid. In addition, heating could be provided with the heat loss that occurs during operation of the electrical control unit 220.

The first housing section 200 comprises a removable first cover element 202. This first cover element 202 facilitates access to all electronics—such as the electrical control unit 220 or the means for generating a controllably variable magnetic field 210A, 210B, 210C, 210D—which is arranged within the first housing section 200. Thus, the dry area and the components of the electronics in the apparatus 100 can be directly accessed for repair, inspection or even testing purposes. Additionally, the first cover element 202 comprises a connector port 204 which can be used as an additional interface for the customer. For example, the apparatus 100 can be connected and operated by means of a customer's own control unit.

Accordingly, the second housing section 300 also has a removable second cover element 302. This second cover element 302 can also be removed for repair purposes, allowing direct access to all wet-running components of the apparatus 100. For example, defective components can also be replaced without having to directly remove the entire apparatus 100 from the vehicle in question.

As already explained, the first housing section 200 and the second housing section 300 are configured to be adjacent to each other by the fluidically impermeable contour wall 150. The contour wall 150 is configured as a single piece. In this embodiment, nearly all of the fluid handling elements 110A, 110B, 110C are arranged on a continuous fluidically impermeable contour wall 150. The continuous fluidically impermeable contour wall 150 is also the outer wall of the second housing section 300.

Figure 2A:
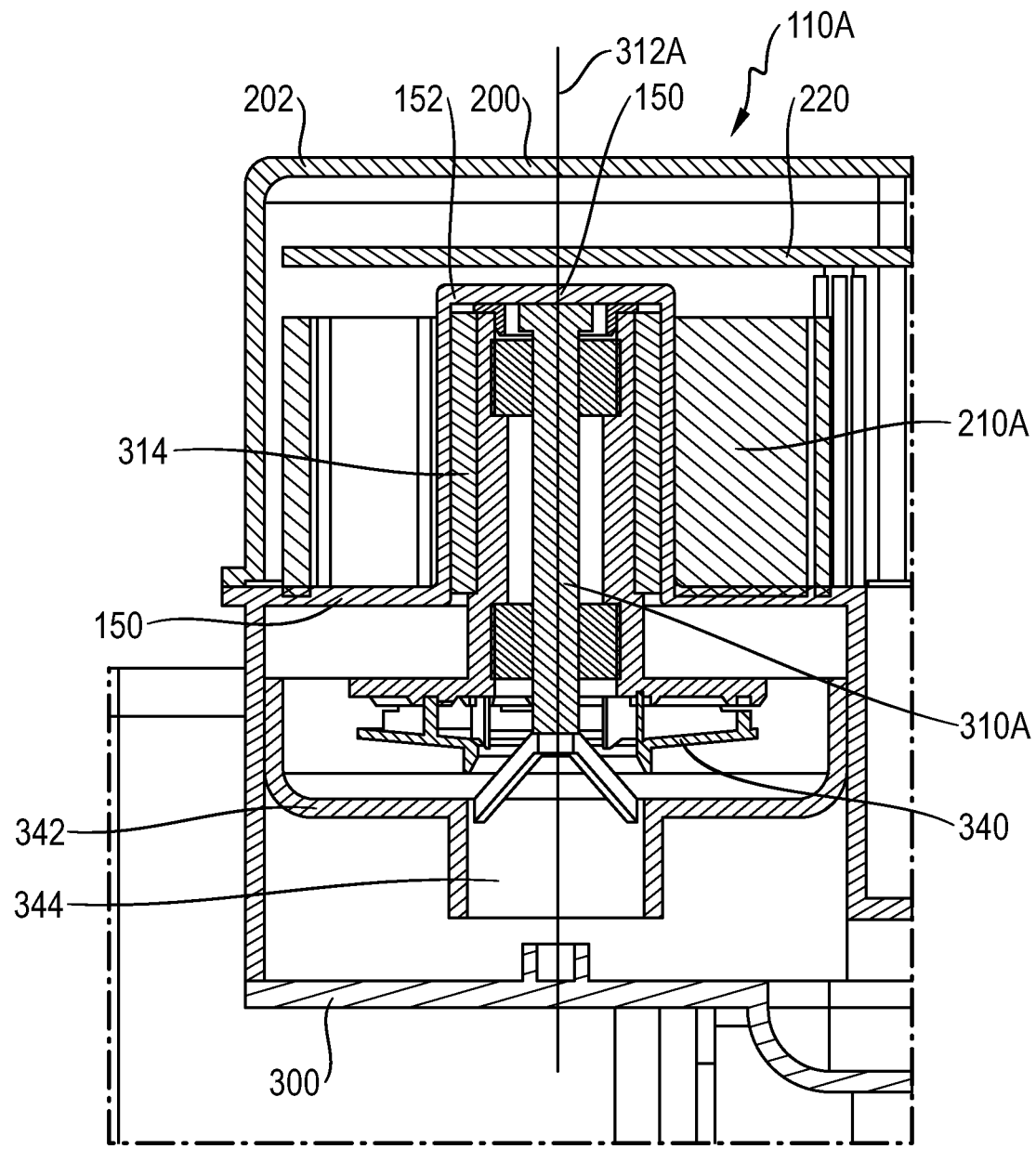
FIG. 2A a detailed longitudinal section of a fluid handling element of the apparatus of the invention.

FIG. 2A shows a detailed longitudinal section of a fluid handling element 110A of the apparatus 100 according to the invention. The apparatus 100 comprises the first housing section 200 and the second housing section 300, wherein the first housing section 200 and the second housing section 300 are configured adjacent to each other by the fluidically impermeable contour wall 150. The contour wall 150 is simultaneously the outer wall of the second housing section 300, whereby the outer wall is identical with the side of the second housing section 300 oriented towards the first housing section 200.

The contour wall 150 comprises a protrusion 152 on the side facing the first housing section 200. The protrusion 152 is surrounded by a means 210A for generating a controllably variable magnetic field in the form of a stator, and the protrusion 152 projects completely through the interior of the stator, filling it almost completely.

In addition, the electrical control unit 220 for controlling the apparatus 100 is located within the first housing section 200. It is arranged above the means 210A for generating a controllably variable magnetic field in the form of a stator. The means 210A for generating a controllably variable magnetic field in the form of a stator and the electrical control unit 220 for controlling the apparatus 100 are closed by a first cover element 202 and protected against external influences such as dirt, moisture or mechanical effects.

Within the second housing section 300, which is configured to carry fluid, a means 310A is arranged which is movable by the generated magnetic field. The means 310A which is movable by the generated magnetic field comprises a rotor 314 with an associated magnet. The rotor 314 is precisely inserted into the protrusion 152 of the contour wall 150, which ensures exact alignment between the rotor 314 and the stator. The rotor 314 is set in rotation by the stator, whereby the means 310A, which is movable by the magnetic field, is set in rotation and can thus be controlled by the stator. To improve the function of the rotor-stator arrangement, an insulator (not shown) is arranged between rotor 314 and the protrusion 152 in a radial direction. For example, a ferritic filling is suitable for this. A running wheel 340 is arranged below the rotor 314, which can be used as a pump for conveying the fluid by rotation. The running wheel 340 is located inside an running wheel housing 342, wherein a fluid inflow opening 344 is located at the lower end of the running wheel housing 342. Fluid thus flows into the running wheel housing 342 through the fluid inflow opening 344 and out through a fluid outflow opening (not shown) due to rotation of the running wheel 340 in a radial direction. Thereby, the running wheel housing 342 may be incorporated into the second housing section 300 as an independent component to be variable depending on the running wheel size and/or the desired pump performance. The rotor 314 comprises a rotor axis 312A, with respect to which the means 310A, which is movable by the magnetic field, including the rotor 314 and the running wheel 340 are arranged rotationally symmetrically.

Figure 2B:
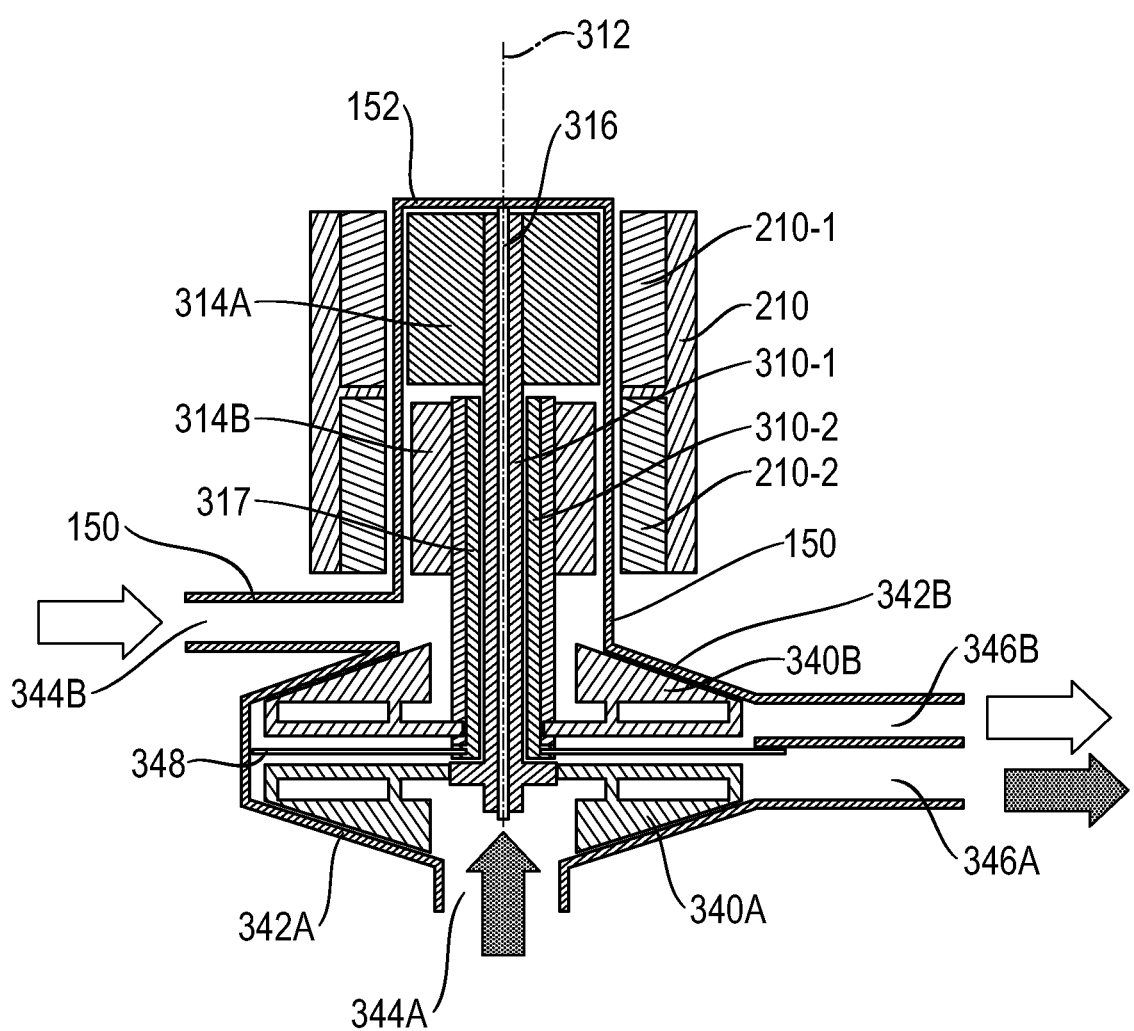
FIG. 2B a detailed longitudinal section of a fluid handling element of the apparatus according to the invention according to an alternative embodiment.

FIG. 2B shows a longitudinal sectional view of an alternative embodiment of a fluid handling element 110 of the apparatus 100 according to the invention. This embodiment also comprises the first housing section (not shown) and the second housing section (not shown), wherein the first housing section 200 and the second housing section 300 are configured to be adjacent to each other by the fluidically impermeable contour wall 150. The contour wall 150 comprises a protrusion 152 on the side oriented towards the first housing section 200. The protrusion 152 is surrounded by means 210 for generating a controllably variable magnetic field in the form of a stator. The stator comprises a first stator 210-1 and a second stator 210-2. The first stator 210-1 and the second stator 210-2 are arranged adjacent to each other in the direction of the rotor axis 312.

The means which is movable by the generated magnetic field is arranged within the second housing section 300, which is configured to carry fluid. The means movable by the generated magnetic field comprises a first means 310-1 movable by the generated magnetic field and a second means 310-2 movable by the generated magnetic field.

The first means 310-1, which is movable by the generated magnetic field, is here associated with the magnetic field of the first stator 210-1 and the second means 310-2, which is movable by the generated magnetic field, is associated with the magnetic field of the second stator 210-2.

Further, the first means 310-1, which is movable by the generated magnetic field of the first stator 210-1, comprises a first rotor 314A with an associated magnet.

Accordingly, the second means 310-2, which is movable by the generated magnetic field of the second stator 210-2, comprises a second rotor 314B with an associated magnet.

Both rotors 314A, 314B are precisely inserted into the protrusion 152 of the contour wall 150 in the second housing section 300. The first rotor 314A is associated with the first stator 210-1. The first rotor 314A is set in rotation by the first stator 210-1, whereby the first means 310-1, which is movable by the magnetic field of the first stator 210-1, can be set in rotation and can thus be controlled by the first stator 210-1.

The second rotor 314B is associated with the second stator 210-2. The second rotor 314B is set in rotation by the second stator 210-2, whereby the second means 310-2, which is movable by the magnetic field of the second stator 210-2, can be set in rotation and can thus be controlled by the second stator 210-2.

A rotor shaft 316 connects the first rotor 314A with a first running wheel 340A, which can be rotated to act as a pump to deliver fluid. The first running wheel 340A is located within a running wheel housing 342A, wherein a fluid inflow opening 344A is located at the lower end of the running wheel housing 342A. Fluid thus flows into the running wheel housing 342A through the fluid inflow opening 344A and out through a fluid outflow opening 346A as a result of rotation of the running wheel 340A in a radial direction.

The second rotor 314B is connected via a hollow rotor shaft 317 with a second running wheel 340B, which can be used as a pump to deliver fluid by rotation. The second running wheel 340B is located within a running wheel housing 342B, wherein fluid flows into the running wheel housing 342B via a laterally arranged fluid inlet port 344B. The rotation of the running wheel 340B causes the fluid to flow out in a radial direction through a fluid outflow opening 346B.

The first running wheel housing 342A and the second running wheel housing 342B are separated from each other by a separator 348. The rotor shaft 316 associated with the first rotor 314A and the first stator 210-1 extends through the hollow rotor shaft 317 and through the second running wheel housing 342B. For example, the hollow rotor shaft 317 may be fixed directly to the separating element 348.

The first running wheel 340A can be operated by selectively controlling the first stator 210-1 by the electrical control unit 220 (not shown). The second running wheel 340B can be operated independently of the first running wheel 340A by selectively controlling the second stator 210-2. Here, the rotors 314A, 314B comprise a common rotor axis 312 with respect to which both the first means 310-1, which is movable by the generated magnetic field of the first stator 210-1, and the second means 310-2, which is movable by the generated magnetic field of the second stator 210-2, are arranged rotationally symmetrically.

This means that two different fluid pumps can be arranged and operated in one compact housing. This results in the additional advantage that two different fluid circuits can be conveyed separately from each other in the apparatus 100.

By separating the stator 210 into a first stator 210-1 and a second stator 210-2, the two pumps can be controlled with different and diverging speeds. This results in a high degree of flexibility and it is possible to follow different operating modes in separate fluid circuits without taking into account any dependencies or influences between the fluid circuits.

To improve the functionality of the apparatus 100, an insulator (not shown) may be arranged between the first rotor 314A and the fluid impermeable contour wall 150 in a radial direction. Similarly, an insulator (not shown) may be arranged between the second rotor 314B and the fluid impermeable contour wall 150 in a radial direction. For example, a ferritic filling is suitable for this.

Figure 2C:
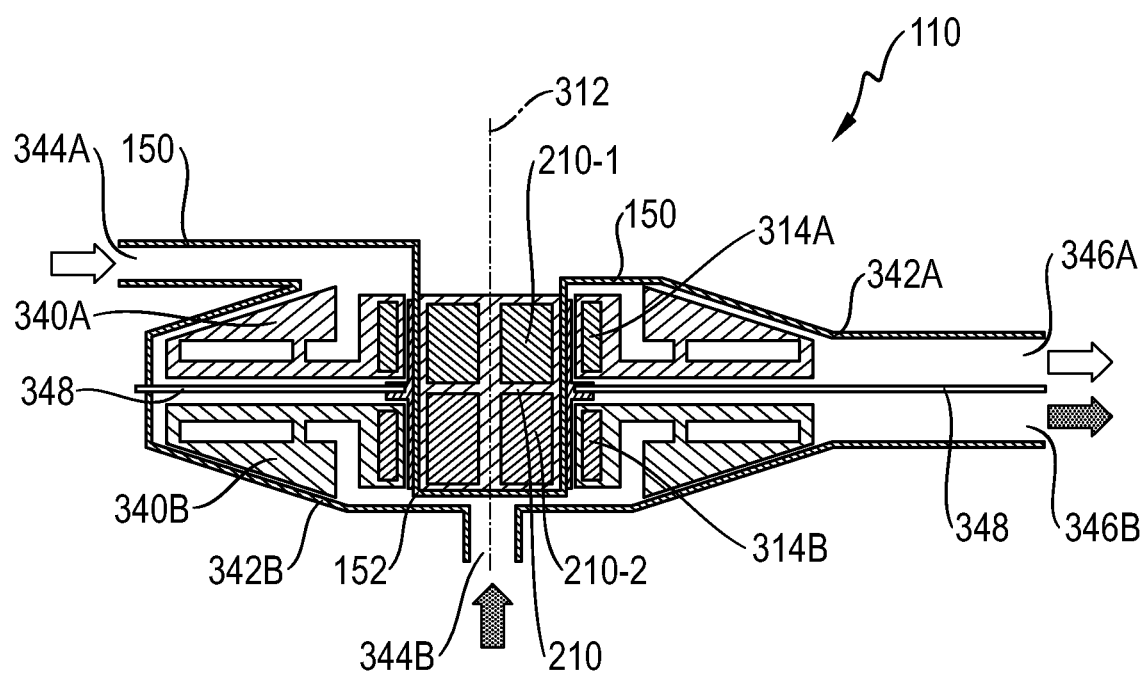
FIG. 2C a detailed longitudinal section of a fluid handling element of the apparatus according to the invention according to a further embodiment.

FIG. 2C shows a detailed longitudinal section of a fluid handling element 110 of the apparatus 100 according to the invention, according to a further embodiment. This embodiment also comprises the first housing section (not shown) and the second housing section (not shown), wherein the first housing section 200 and the second housing section 300 are configured to be adjacent to each other by the fluidically impermeable contour wall 150. The contour wall 150 comprises a protrusion 152 on the side oriented towards the second housing section 300. A means 210 for generating a controllably variable magnetic field in the form of a stator is inserted into the protrusion 152. The stator comprises a first stator 210-1 and a second stator 210-2. The first stator 210-1 and the second stator 210-2 are arranged adjacent to each other in the direction of the rotor axis 312.

The means which can be moved by the generated magnetic field is arranged in the second housing section 300, which is configured to carry fluid. The means which is movable by the generated magnetic field comprises a first rotor 314A and a second rotor 314B.

The first rotor 314A is associated with the magnetic field of the first stator 210-1 and the second rotor 314B is associated with the magnetic field of the second stator 210-2.

Both rotors 314A, 314B are arranged in the second housing section 300 around the protrusion 152 of the contour wall 150. The first rotor 314A is here associated with the first stator 210-1 and is caused to rotate by the first stator 210-1 and is thus controllable by the first stator 210-1.

The first rotor 314A is connected with a first running wheel 340A, which can be used as a pump to deliver fluid by rotation. The first running wheel 340A is arranged radially outwardly of the first rotor 314A and is located within a running wheel housing 342A.

Fluid enters the running wheel housing 342A through a fluid inlet port 344A arranged on the side and flows out through a fluid outlet port 346A due to the rotation of the running wheel 340A in a radial direction.

The second rotor 314B is associated with the second stator 210-2. The second rotor 314B is caused to rotate by the second stator 210-2 and is thus controllable by the second stator 210-2.

The second rotor 314B is connected with a second running wheel 340B, which can be used as a pump for pumping the fluid by rotation. The second running wheel 340B is located radially outside the second rotor 314B and is arranged in a running wheel housing 342B. Fluid flows into the running wheel housing 342B from below via a fluid inlet port 344B. Due to the rotation of the running wheel 340B, the fluid is discharged in a radial direction through a fluid outflow opening 346B.

The first running wheel housing 342A and the second running wheel housing 342B are configured to be separated from each other by means of a separating element 348. For example, the separating element 348 is arranged radially outwardly on the protrusion 152 of the contour wall 150 and the protrusion 152 comprises holders formed for this purpose.

The first running wheel 340A can be operated by selectively controlling the first stator 210-1 by the electrical control unit 220 (not shown). The second running wheel 340B can be operated independently of the first running wheel 340A by selectively controlling the second stator 210-2. Here, the rotors 314A, 314B comprise a common rotor axis 312 with respect to which both the first stator 210-1 and the second stator 210-2, as well as the first running wheel 340A and the second running wheel 340B are arranged rotationally symmetrically.

This means that two different fluid pumps can be arranged and operated in one compact housing. This results in the additional advantage that two different fluid circuits can be conveyed separately from each other in the apparatus 100. By separating the stator 210 into a first stator 210-1 and a second stator 210-2, the two pumps can be controlled with different and diverging rotational speeds. This results in a high degree of flexibility and it is possible to follow different operating modes in separate fluid circuits without having to consider any dependencies or influences between the fluid circuits. In contrast to the embodiment of FIG. 2B, the fluid handling element 110 of this embodiment requires significantly less axial installation space. This is due to the shape of an external rotor. The stators are arranged inside the rotors and the associated running wheels are also located radially outside the rotors. This significantly increases the outer diameter of this embodiment of a fluid handling element, whereby a higher overall running smoothness and a greater tolerance with regard to pressure waves can be provided. The internal stator, on the other hand, can be configured smaller, which reduces manufacturing costs. In a further embodiment, it would also be conceivable to realise the external rotor arrangement with only one stator and only one associated rotor.

To improve the function of the apparatus 100, an insulator (not shown) may be arranged between the first rotor 314A and the fluid impermeable contour wall 150. Similarly, an insulator (not shown) may be arranged between the second rotor 314B and the fluid impermeable contour wall 150. For example, a ferritic material is suitable for this.

Figure 3:
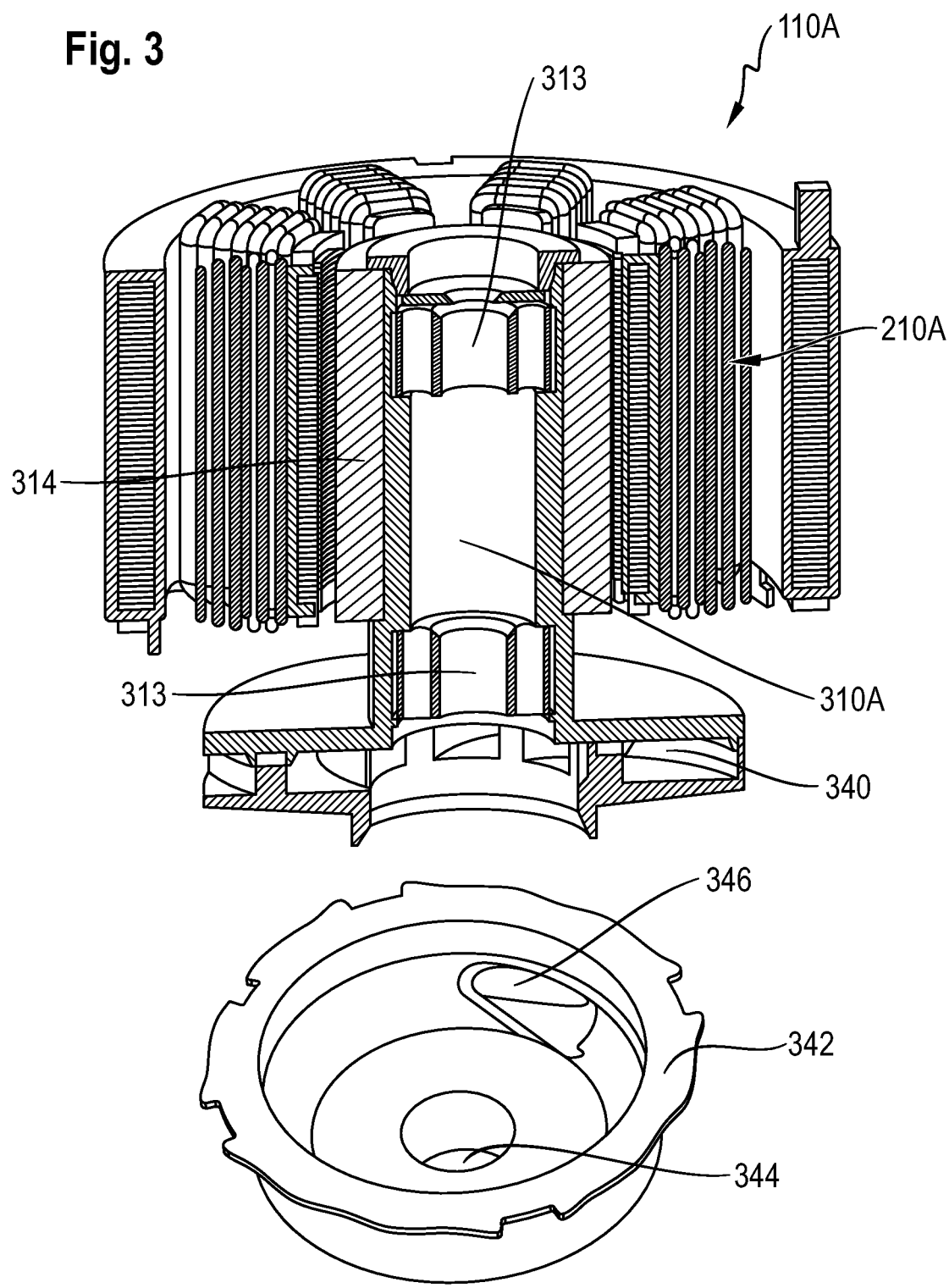
FIG. 3 a longitudinal sectional view of a fluid handling element of the apparatus according to the invention.

FIG. 3 shows a longitudinal sectional view of a fluid handling element 110A of the apparatus 100 according to the invention. The means 210A for generating a controllably variable magnetic field in the form of a stator is arranged in the first housing section (not shown). Separated from the contour wall (not shown) and thus in the adjacent second housing section 300 (not shown), the means 310A configured to be movable by the magnetic field in the form of a rotor 314 is arranged. The rotor 314 is surrounded in radial direction by an insulator (not shown). The rotor 314 also comprises two bearings 313, which are configured to accommodate the rotor axis. The running wheel 340 for the radial outflow of fluid is located at a lower section of the rotor 314.

Below the running wheel 340 is the running wheel housing 342, in a perspective illustration. The running wheel housing 342 shows the fluid inlet opening 344, which is arranged centrally in a base piece of the running wheel housing 342. Additionally, the running wheel housing 342 includes a fluid outflow opening 346 arranged in a side wall. Fluid flows into the running wheel housing 342 via the fluid inlet port 344 and out via the fluid outlet port 346 due to the rotation of the running wheel 340 in a radial direction. This creates the pumping action of the fluid handling element 110A.

Figure 4:
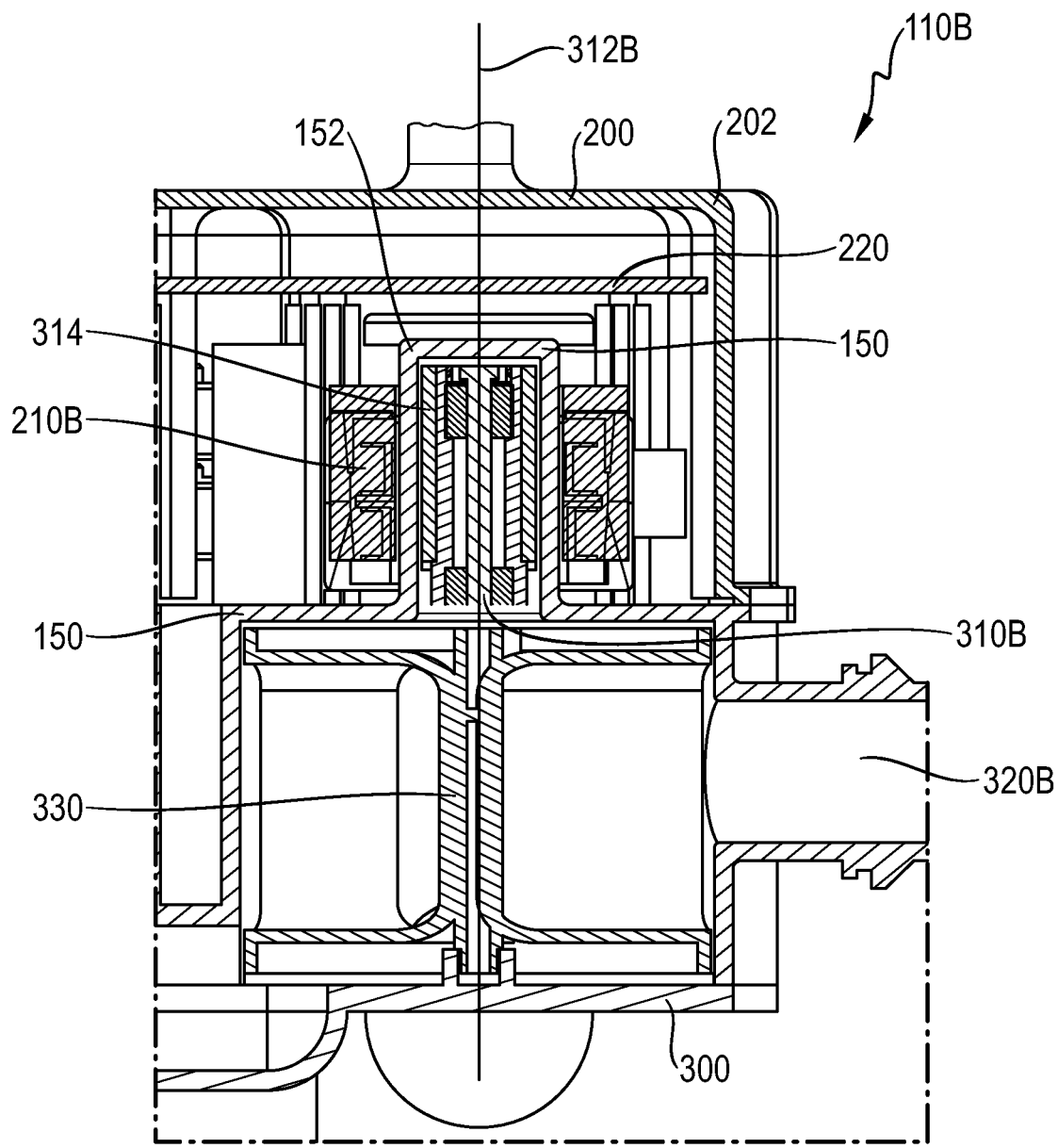
FIG. 4 a detailed longitudinal section of a further fluid handling element of the apparatus according to the invention.

FIG. 4 shows a detailed longitudinal section of a further fluid handling element 110B of the apparatus 100 according to the invention. The apparatus 100 comprises the first housing section 200 and the second housing section 300, wherein the first housing section 200 and the second housing section 300 are configured adjacent to each other by the fluidically impermeable contour wall 150. The contour wall 150 is also the outer wall of the second housing section 300, whereby the outer wall is identical with the side of the second housing section 300 oriented towards the first housing section 200.

The contour wall 150 comprises a protrusion 152 on the side facing the first housing section 200. The protrusion 152 is surrounded by a means 210B for generating a controllably variable magnetic field in the form of a stator, and the protrusion 152 projects completely through the interior of the stator, filling it almost completely.

In addition, the electrical control unit 220 for controlling the apparatus 100 is located within the first housing section 200 and is arranged above the means 210B for generating a controllably variable magnetic field in form of a stator. The means 210B for generating a controllably variable magnetic field in the form of a stator and the electrical control unit 220 for controlling the apparatus 100 are closed by a first cover element 202 and protected against external influences such as dirt, moisture or mechanical effects.

Within the second housing section 300, which is configured to carry fluid, a means 310B, which is movable by the generated magnetic field, is arranged. The means 310B which is movable by the generated magnetic field comprises a rotor 314 with an associated magnet. The rotor 314 is precisely inserted into the protrusion 152 of the contour wall 150, which ensures exact alignment between the rotor 314 and the stator. The rotor 314 is caused to rotate by the stator, whereby the means 310B, which is movable by the magnetic field, can be caused to rotate and is thus controllable by the stator. To improve the function of the rotor-stator arrangement, an insulator (not shown) is arranged between rotor 314 and the protrusion 152 in a radial direction. For example, a ferritic filling is suitable for this. A switching element 330 is arranged below the rotor 314. The switching element can be configured as a rotary slide valve, whereby fluid can be diverted depending on the specific position of the rotary slide valve. The diversion of fluid allows for a variety of ports and switching modes within the apparatus 100. This makes the apparatus 100 or fluid handling element 110B adaptable to different vehicles and the corresponding desired function. A port 320B is arranged laterally of the switching element 330, which port is configured for the inflow and/or outflow of fluid. The fluid handling element 110B comprises a rotor axis 312B, with respect to which the means 310B, which is movable by the magnetic field, the rotor 314 and the switching element 330 are arranged rotationally symmetrically.

Figure 5:
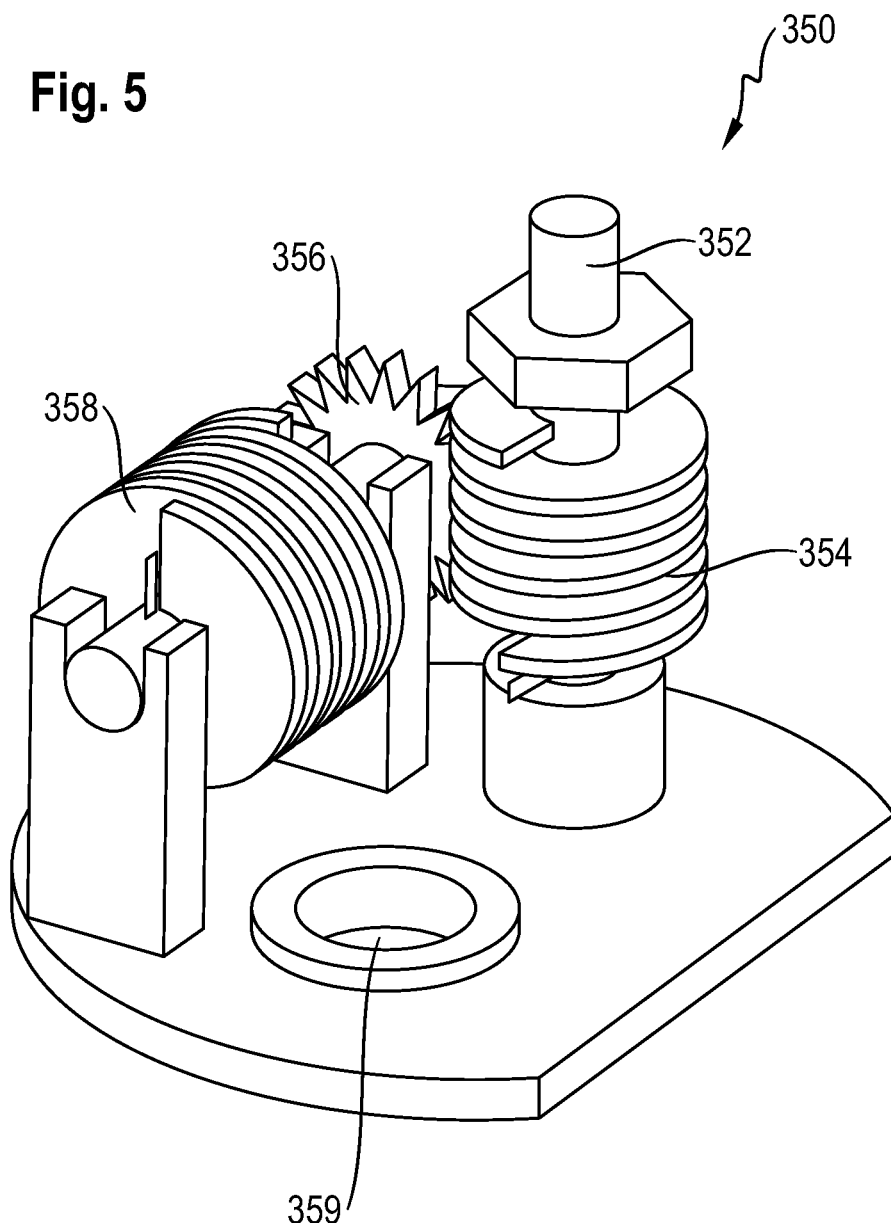
FIG. 5 a schematic illustration of a wet-running gearbox of the apparatus according to the invention.

FIG. 5 shows a schematic illustration of a wet-running gearbox 350 of the apparatus 100 according to the invention. The wet-running gearbox 350 comprises a drive element 352, which receives the torque of the rotor. The torque causes a drive worm 354 to rotate via the drive element 352. A laterally arranged gear wheel 356 couples an associated gear stage 358. A rotary slide opening 359 is located directly at the gear stage 358. In the assembled state, an output element of the rotary slide (not shown) projects through the rotary slide opening 359 and engages directly in the gear stage 358 of the wet-running gearbox 350. This allows to control the exact position of the switching element 330, which is configured as a rotary slide. Due to the prevailing self-locking of the wet-running gearbox 350, no force (magnetic or electrical) is required to keep the rotary slide in position. This brings considerable advantages with proportional operation, for example. With this wet-running gearbox 350, any number of gear stages 358 can be coupled to finally determine the position of the coupled switching element 330 based on the stator controlled by the electrical control unit 220. The wet gearbox 350 is arranged directly in the fluid and thus in the second housing section 300. This means that no dynamic seals are required. The necessary lubrication of the wet-running gearbox 350 takes place directly via the cooling fluid and the heat loss due to friction is dissipated directly into the cooling fluid.

FIGS. 6A to 6G show several schematic illustrations of a double rotary sliding valve arrangement 360 of the apparatus 100 according to the invention. Simple rotary sliding valve arrangements comprise so-called 2×90° deflections. These 2×90° deflections comprise the disadvantage that channels cannot be connected to each other across two different planes. The double rotary sliding valve arrangement 360 according to the invention comprises a first level 360A and a second level 360B. The advantage of this double rotary sliding valve arrangement 360 is that two rotary sliding valves can be operated simultaneously with only one rotary sliding valve arrangement. This saves an additional fluid handling element 110B or an additional rotary sliding valve, which must be operated with an additional stator-rotor arrangement.

Figure 6A:
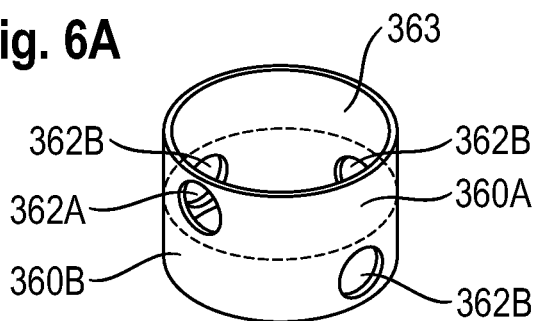
FIG. 6 several schematic illustrations of a rotary valve assembly of the apparatus according to the invention.

FIG. 6A shows a schematic illustration of a rotary sliding valve wall 363 of a double rotary sliding valve arrangement 360. The rotary sliding valve wall 363 is part of the housing which accommodates the rotary sliding valve—in this embodiment with upper and lower channel connecting elements 364, 365. The rotary valve wall 363 comprises a plurality of inlet and outlet openings 362A, 362B, which are arranged either in the first plane 360A or in the second plane 360B. Here, only one upper inlet and outlet opening 362A is located on the upper first plane 360A, while three lower inlet and outlet openings 362B are located on the lower second plane 360B. The inlet and outlet openings 362A, 362B are arranged around the entire circumference of the rotary valve wall 363 with a distance of 90° from each other.

Figure 6B:
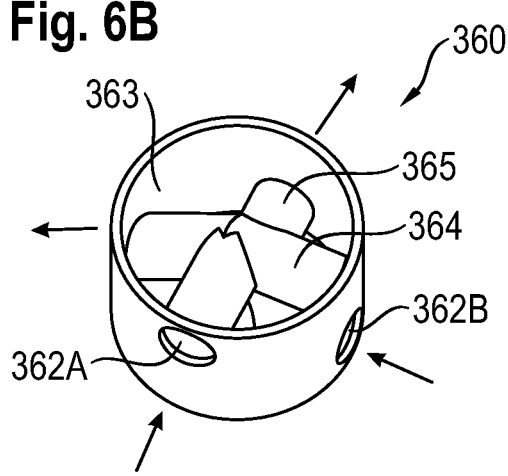

FIG. 6B is a schematic illustration of a double rotary sliding valve arrangement 360. The rotary sliding valve wall 363 comprises the upper first level 360A with an upper inlet and outlet opening 362A and the lower second level 360B with a total of three lower inlet and outlet openings 362B. Inside the rotary sliding valve wall 363 there is an upper channel connecting element 364 and a lower channel connecting element 365. The two channel connecting elements 364, 365 are arranged to be rotatable relative to the rotary sliding valve wall 363. However, the upper channel connecting element 364 and the lower channel connecting element 365 cannot be rotated relative to each other. They therefore configure a common channel connecting element.

The upper channel connecting element 364 is configured in a T-shape in plan view with a total of three channel arms. Two of the three channel arms lie in the first plane 360A and one of the three channel arms extends into the second plane 360B. By this arrangement, the upper channel connecting element 364 can be aligned relative to the rotary valve wall 363 such that the upper inlet and outlet opening 362A of the first plane 360A is connected with a lower inlet and outlet opening 362B. Thus, fluid can flow into the double rotary sliding valve arrangement 360 via the upper inflow and outflow opening 362A and flow out of the lower inflow and outflow opening 362B, or vice versa. One of the three channel arms remains thereby unused and ends blindly at the rotary sliding valve wall 363 without an inflow and outflow opening.

Like the upper channel connecting element 364, the lower channel connecting element 365 is configured in a T-shape in plan view with a total of three channel arms. In contrast to the upper channel connecting element 364, all three channel arms are located in one plane, the second plane 360B. In the present arrangement, two of the three channel arms connect two lower inlet and outlet openings 362B at an angle of 90°. The third channel arm remains unused and ends blindly at the rotary sliding valve wall 363 without an inflow and outflow opening.

Figure 6C:
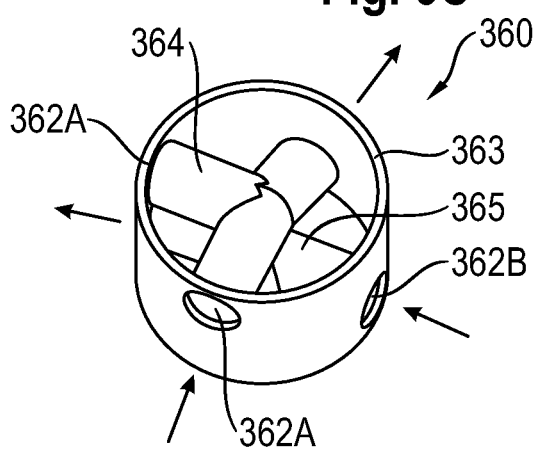

FIG. 6C shows the double rotary sliding valve arrangement 360 according to FIG. 6B in a different arrangement. The rotary sliding valve wall 363 comprises the upper first level 360A with the upper inlet and outlet opening 362A and the lower second level 360B with a total of three lower inlet and outlet openings 362B. Within the rotary sliding valve wall 363 there is an upper channel connecting element 364 and a lower channel connecting element 365. The upper channel connecting element 364 is configured in a T-shape in plan view with three channel arms, wherein two of the three channel arms are located in the first plane 360A and one of the three channel arms extends into the second plane 360B. Like the upper channel connecting element 364, the lower channel connecting element 365 is configured in a T-shape in plan view with three channel arms. In contrast to the upper channel connecting element 364, all three channel arms are located in one plane, the second plane 360B.

In the present arrangement, the two channel connecting elements 364, 365 are in a 90° rotated arrangement relative to the rotary sliding valve wall 363 compared to the arrangement in FIG. 6B.

By this arrangement, the upper channel connecting element 364 is oriented relative to the rotary sliding valve wall 363 such that the upper inflow and outflow opening 362A of the first level 360A is connected with another lower inflow and outflow opening 362B, namely with that inflow and outflow opening 362B which is opposite the upper inflow and outflow opening 362A. Thus, fluid can flow into the double rotary sliding valve arrangement 360 via the upper inflow and outflow opening 362A and flow out of another lower inflow and outflow opening 362B or vice versa. The third channel arm remains unused here and ends blindly at the rotary sliding valve wall 363 without an inflow and outflow opening.

In the present arrangement, the lower channel connecting element 365 is oriented relative to the rotary sliding valve wall 363 such that two other lower inflow and outflow openings 362B are connected to each other at an angle of 180°. Thus, fluid can flow into the double rotary sliding valve arrangement 360 via the lower inflow and outflow opening 362B and out of an opposite lower inflow and outflow opening 362B, or vice versa. The third channel arm remains unused and ends blindly at the rotary sliding valve wall 363 without an inflow and outflow opening.

Figure 6D:
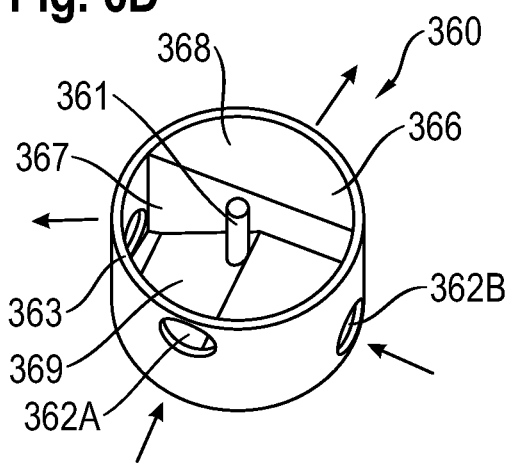

FIG. 6D shows an alternative embodiment of a double rotary sliding valve arrangement 360 according to the invention. This double rotary sliding valve arrangement 360 also comprises a first level 360A and a second level 360B. This embodiment can also operate two rotary sliding valves simultaneously with only one rotary sliding valve arrangement. This also saves an additional fluid handling element 110B or an additional rotary sliding valve, which must be operated with an additional stator-rotor arrangement.

This double rotary sliding valve arrangement 360 comprises a rotary sliding valve wall 363 identical with the preceding figures. The rotary sliding valve wall 363 comprises a plurality of inlet and outlet openings 362A, 362B, wherein only one upper inlet and outlet opening 362A is located on the upper first plane 360A, while three lower inlet and outlet openings 362B are located on the lower second plane 360B. The inflow and outflow openings 362A, 362B are arranged around the entire circumference of the rotary sliding valve wall 363 with a distance of 90° from each other.

Inside the rotary sliding valve wall 363 there is a setting element 366 which is arranged to rotate about a central axis 361. The setting element 366 separates an inner space, which is defined by the rotary sliding valve wall 363 in the radial direction and by two end planes that axially limit the rotary sliding valve wall 363, into a first partial space and a second partial space. This separation is achieved by several surfaces that—due to their specific arrangement—fulfil an identical function as in the case of the embodiments of FIGS. 6B and 6C. The setting element 366 comprises a longitudinal plane 367 which is arranged parallel to the central axis 361 but spaced from it. The extent of the spacing of the longitudinal plane 367 from the central axis 361 depends on the diameter of the upper and lower inflow and outflow openings 362A, 362B, since the inflow and outflow of fluid through the upper and lower inflow and outflow openings 362A, 362B should take place without restrictions. The longitudinal plane 367 must therefore comprise a distance from the central axis 361 which corresponds approximately to half the diameter of the respective inflow and outflow openings 362A, 362B. The longitudinal plane 367 is continued at a front end of the rotary sliding valve wall 363 with an outer flat plane 368, wherein the the rotary sliding valve wall 363 delimits the first plane 360A of the double rotary sliding valve arrangement 360 outwardly at its front end, with an outer flat plane 368. The outer flat plane 368 is arranged orthogonally to the central axis 361 and is radially directly adjacent to the rotary sliding valve wall 363. In addition, the setting element 366 comprises an inclined plane 369 which allows fluidic communication at least between the upper inflow and outflow opening 362A and a lower inflow and outflow opening 362B offset by 90°. The inclined plane 369 intersects the central axis 361 and the longitudinal plane 367. The first partial space is thus defined by a front plane, which axially limits the rotary sliding valve wall 363 and contains the outer flat plane 368, the inclined plane 369 and the longitudinal plane 367. The first partial space is located, so to speak, at least mostly above the setting element 366 when the setting element 366 is brought into the double rotary sliding valve arrangement 360. The first partial space is located, so to speak, at least mostly above the setting element 366 when the setting element 366 is brought into the double rotary sliding valve arrangement 360. The second partial space is accordingly at least partially below the outer flat plane 368 and the inclined plane 369.

The setting element 366 can be aligned in the rotary sliding valve wall 363 such that the upper inflow and outflow opening 362A of the first level 360A is fluidly connected with a lower inflow and outflow opening 362B. Thus, fluid can flow into the double rotary sliding valve arrangement 360 through the upper inflow and outflow opening 362A and out of the lower inflow and outflow opening 362B, or vice versa. With other words, fluid can change planes 360A, 360B as it flows through the first partial space.

In this arrangement of the setting element 366, the second partial space below the setting element 366 fluidically connects two lower inlet and outlet ports 362B at a 90° angle. The fluid thus remains in the second plane 360B from the time it enters the double rotary sliding valve arrangement 360, being diverted through 90°, until it exits the double rotary sliding valve arrangement 360.

Figure 6E:
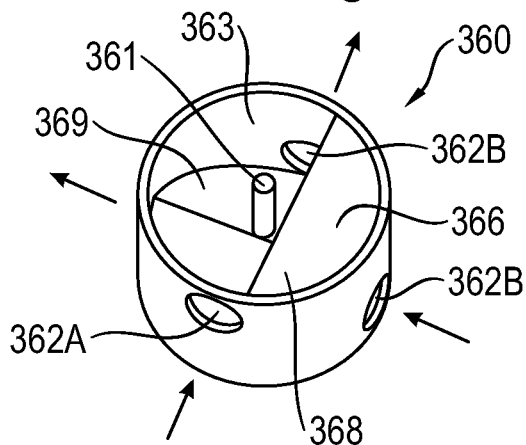

FIG. 6E shows the double rotary sliding valve arrangement 360 shown in FIG. 6D in a different configuration. The rotary sliding valve wall 363 comprises the upper first level 360A with upper inlet and outlet ports 362A and the lower second level 360B with a total of three lower inlet and outlet ports 362B. Within the rotary sliding valve wall 363 the setting element 366 is arranged. In the present arrangement, the setting element 366 is in a 90° rotated arrangement relative to the rotary sliding valve wall 363 as compared to the arrangement of FIG. 6D.

The setting element 366 is oriented in the rotary sliding valve wall 363 such that the upper inflow and outflow opening 362A of the first level 360A is fluidly connected to another lower inflow and outflow opening 362B, which is opposite the upper inflow and outflow opening 362A. Thus, fluid can flow into the double rotary sliding valve arrangement 360 via the upper inlet and outlet opening 362A and out of the other lower inlet and outlet opening 362B, or vice versa.

In this arrangement of the setting element 366, two other lower inlet and outlet ports 362B, which are arranged opposite each other, are fluidically connected to each other through the second partial space below the setting element 366. In contrast to the arrangement shown in FIG. 6D, fluid flows in and out of the double rotary sliding valve arrangement 360 in the same direction. Likewise, the fluid remains in the second plane 360B from the time it flows into the double rotary sliding valve arrangement 360 until it flows out of the double rotary sliding valve arrangement 360.

Figure 6F:
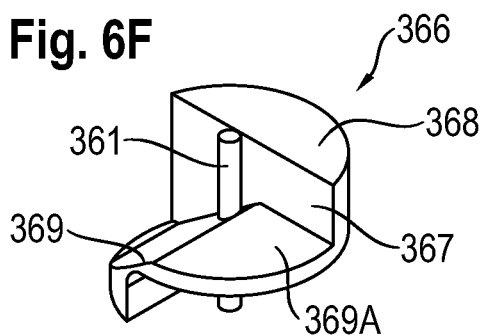

FIG. 6F shows the setting element 366 with the central axis 361, the inclined plane 369, the longitudinal plane 367 and the flat plane 368 in a perspective illustration. In addition, the setting element 366 includes a short inflow plane 369A which flattens the inclined plane 369 in an upper portion. The central axis 361 has an upper section suitable for connection to the wet-running gearbox (not shown), and a lower section suitable for supporting the setting element 366.

Figure 6G:
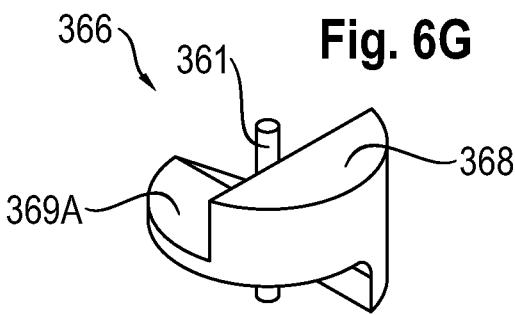

FIG. 6G shows the setting element 366 according to FIG. 6F in an alternative perspective illustration.

Such setting elements 366 are usually manufactured by injection molding. It is less complex in design than, for example, a branched channel arrangement. The injection mold can be configured as a simple "open/close" mold, eliminating the need for additional side slides. This reduces the design, maintenance and manufacturing costs of the setting element 366.

Figure 7:
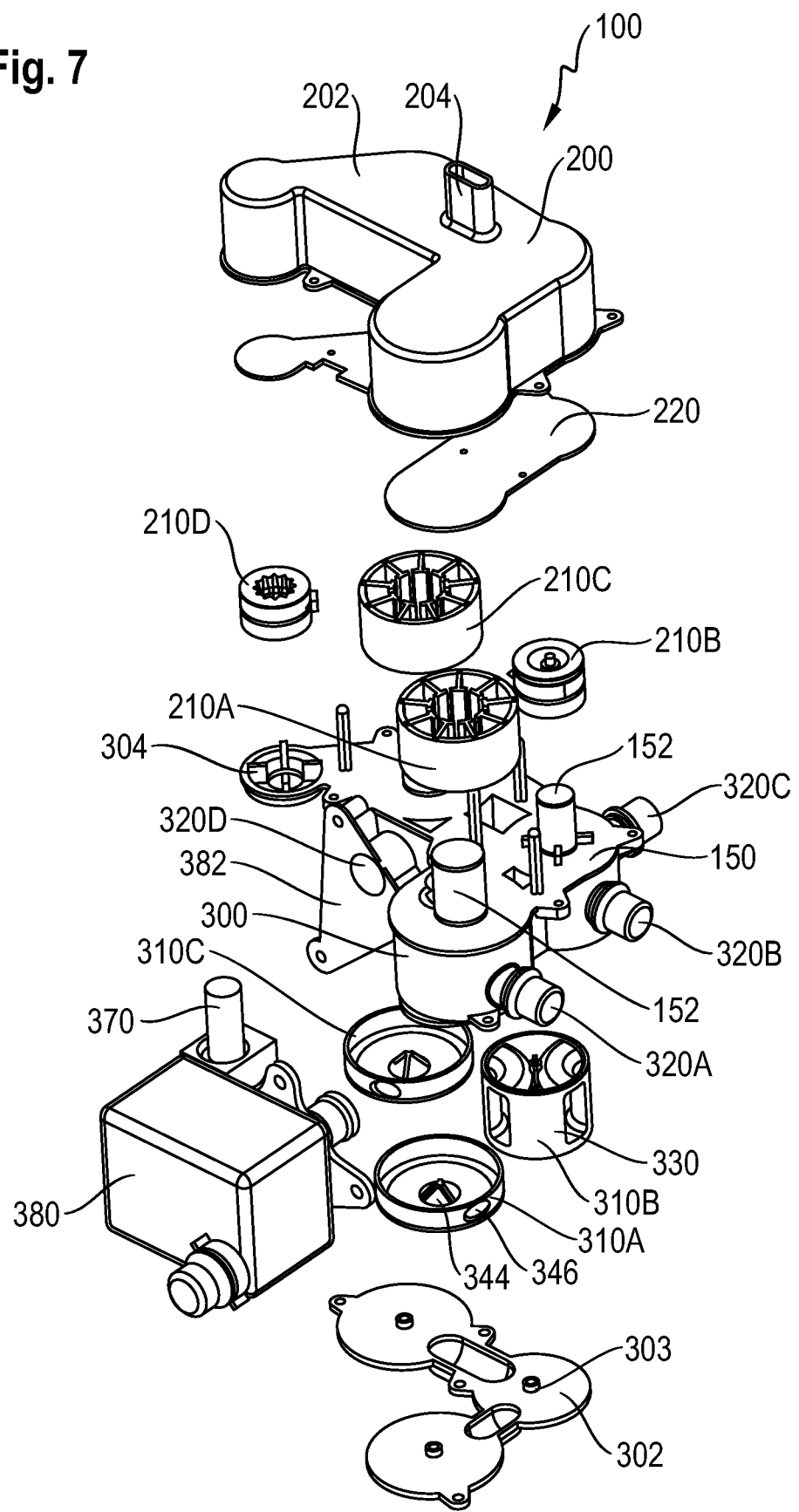
FIG. 7 an exploded view of an apparatus for handling a fluid according to the invention according to a further embodiment.

FIG. 7 shows an exploded view of an apparatus 100 according to the invention for handling fluid according to a further embodiment. The apparatus 100 comprises the first housing section 200 and the second housing section 300, wherein the first housing section 200 and the second housing section 300 are configured adjacent to each other by the fluidically impermeable contour wall 150. The contour wall 150 is configured as a single piece. In this embodiment, the contour wall 150 is also the outer wall of the second housing section 300, whereby the outer wall is identical with the side of the second housing section 300 oriented towards the first housing section 200.

The contour wall 150 comprises cylindrical protrusions 152 on the side oriented towards the first housing section 200. Means 210A, 210B, 210C for generating a controllably variable magnetic field in the form of stators are applied to these cylindrical protrusions 152. The cylindrical protrusions 152 each project into the interior space of each arranged stator and completely fill this interior space. In the present embodiment, the means 210A, 210B, 210C, 210D for generating a controllably variable magnetic field are configured as stators of stepper motors.

On the side (not shown) of the contour wall 150 oriented towards the second housing section 300, there are means 310A, 310B, 310C which are configured to be movable by the generated magnetic field of the respective associated means 210A, 210B, 210C for generating a controllably variable magnetic field. The means 310A, 310B, 310C, which are configured to be movable by the generated magnetic field, each comprise a rotor with an associated magnet (not shown). The rotor is set in rotation by the stator, whereby the means 310A, 310B, 310C, which are configured to be movable by the magnetic field, can be controlled by the stator. The means 310A, 310B, 310C, which are movable by the generated magnetic field, are each associated with means for conveying and/or controlling fluid. Thus, the stator of the means 210B for generating a controllably variable magnetic field is assigned to the switching element 330, which is configured as a rotary sliding valve. Due to the rotary sliding valve, different installation spaces and different requirements can be realized with different switching strategies in each case. Fluid can be diverted and different ports and switching modes can be combined.

A running wheel 340 (not shown) is associated with each of the stator of the means 210A, 210C for generating a controllably variable magnetic field. The running wheel 340 is configured as an impeller and is directly integrated into a fluid circuit within the second housing section 300. Torque is generated by the stator via magnetic coupling to the rotor, resulting in rotation of the impeller. Thus, the impeller can be used as a pump of the respective associated fluid circuit.

The rotors associated with the means 310A, 310B, 310C, which are configured to be movable by the magnetic field, are each placed in the cylindrical protrusion 152 for receiving a rotor located in the second housing section 300. In other words, the cylindrical protrusion 152 enables both the precise arrangement of a stator in the first housing section 200 and the precise arrangement of a rotor in the second housing section 300, thus realizing an exact assignment of rotor and stator to each other. The cylindrical protrusion 152 thus fulfills the dual function of assigning the rotor to the stator on the one hand and providing fluid-tight separation between the first housing section 200 and the second housing section 300 on the other hand, which can be described as hydraulic decoupling.

The combination of means 210A, 210B, 210C for generating a controllably variable magnetic field in the form of a stator, which is arranged in the dry first housing section 200, the respective associated means 310A, 310B, 310C, which is movable by the generated magnetic field, each describe a fluid handling element 110A, 110B, 110C, wherein the means 310A, 310B, 310C is arranged in the wet second housing section 300 and is operable across the contour wall 152 by a magnetic coupling.

The means 210D for generating a controllably variable magnetic field in the form of a stepper motor is associated with the dry first housing section 200. Additionally, means movable by the generated magnetic field is associated, which is configured in the form of an expansion valve 370. In contrast to the fluid handling elements 110A, 110B, 110C described above, no continuous fluid impermeable contour wall exists between the means 210D for generating a controllably variable magnetic field and the means which is movable by the generated magnetic field. The latter is integrated into the housing of the expansion valve 370 and the expansion valve 370 is merely arranged parallel to the other fluid handling elements 110A, 110B, 110C on the housing section of the apparatus, wherein the stepper motor is integrated into the dry area of the first housing section 200. A total of four lateral retaining means 304 are arranged to stabilize the expansion valve 370 in the apparatus 100.

Overall, the apparatus 100 in the present embodiment has a first fluid handling element 110A, which is configured as a fluid pump. In addition, the apparatus 100 comprises a second fluid handling element 110C, which also comprises a fluid pump. This allows two separate fluid circuits to be operated or allows fluid from two separate fluid circuits to be conveyed. Additionally, the apparatus 100 comprises a third fluid handling element 110B, which comprises a fluid valve or switching element 330. The fluid valve is configured with a rotary sliding valve, and the rotary sliding valve makes the apparatus 100 adaptable to different vehicles. Different installation spaces and different requirements of the vehicle can be implemented, for example, by diverting the fluid. By switching the rotary sliding valve, it is possible to switch from parallel fluid circuits to serial fluid circuits. The expansion valve 370, is configured to operate a heat exchanger 380. The heat exchanger 380 is laterally fixed to the second housing section 300 by means of a flange 382.

All of the fluid handling elements 110A, 110B, 110C are arranged on the apparatus 100 such that the rotor axes (not shown) of the fluid handling elements 110A, 110B, 110C are arranged parallel to each other. This greatly simplifies fabrication and assembly of the entire apparatus 100, wherein additionally individual assemblies can be easily tested and replaced.

A plurality of ports 320A, 320B, 320C, 320D are arranged on the second housing section 300 for fluid inflow and outflow. The ports serve as customer interfaces and can be varied in terms of hose diameter and corresponding positions as required. The present embodiment includes a total of four ports 320A, 320B, 320C, 320D which discharge fluid laterally from the second housing section 300 or introduce fluid laterally into the second housing section 300. A port 320D is used for connection with a heat exchanger 380.

The apparatus 100 comprises the electrical control unit 220, which is also arranged in the dry first housing section 200. The electrical control unit 220 is configured as a flat body as is usual, for example, for control circuit boards or the like. The control unit 220 is arranged above the means formed as stators for generating a controllably variable magnetic field 210A, 210B, 210C, 210D. The electrical control unit 220 is necessary for controlling the apparatus 100. For example, the control unit 220 could also be arranged between the individual stators within the first housing section 200, but immediately adjacent to the fluidically impermeable contour wall 150. This would be advantageous as the electrical control unit 220 could be additionally cooled without risking direct contact with the fluid. In addition, heating could be provided with the heat loss generated during operation of the electrical control unit 220. Alternatively, the electrical control unit 220 could also be arranged outside the apparatus 100. This is suitable, for example, for external customer-specific control units which are connected to the apparatus 100 via an interface—for example via the connector port 204.

The first housing section 200 includes a removable first cover element 202. This first cover element 202 simplifies access to all electronics arranged within the first housing section 200. Thus, the dry area and the components of the electronics in the apparatus 100 can be directly accessed for repair, inspection, or even testing purposes. For example, the cover element 202 can be connected to the second housing section 300 by means of a screw connection. Alternatively, however, a clamp or snap-in connection is equally conceivable. Additionally, the first cover element 202 comprises a connector port 204, which can be used as an additional interface to the customer. For example, the apparatus 100 can be connected and operated by means of a customer's own control unit.

Accordingly, the second housing section 300 also has a removable second cover element 302. This second cover element 302 can also be removed for repair purposes, allowing direct access to all wet-running components of the apparatus 100. For example, defective components can also be replaced without directly removing the entire apparatus 100 from the vehicle in question. The second cover element 302 has a total of three bearings 303 configured to receive the respective means 310A, 310B, 310C which is movable by the generated magnetic field. For example, the lower portion of the central axis 361 (not shown) of the setting element 366 (not shown) can be received by the associated bearing 303 in the second cover element 302.

Figure 8:
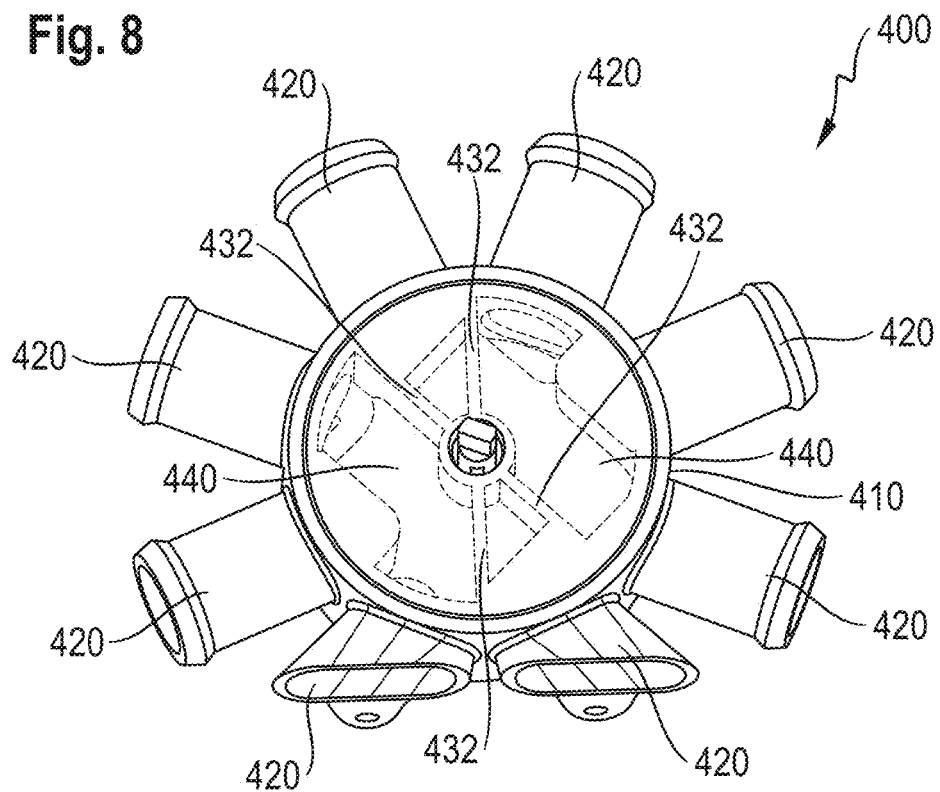
FIG. 8 a schematic illustration of a valve device according to the invention.

FIG. 8 shows a schematic illustration of a valve device 400 according to the invention. The valve device 400 comprises a valve housing 410 and a valve body 430 rotatably mounted within the valve housing 410. The valve housing 410 is illustrated transparently to show the connecting channels 440 configured by the embodiment of the valve body 430. The valve body 430 shown here comprises four connecting channels 440.

As can be seen in FIG. 8, the valve housing 410 comprises eight radially arranged port openings 420, which are used for fluid inflow or outflow. The four connecting channels 440 each fluidically connect two of the eight port openings 420. The eight port openings 420 are arranged within a common port plane, wherein an axis of rotation R, about which the valve body 430 is rotatably mounted, is an orthogonal to the port plane. The port openings 420 are arranged in such a way that they are distributed regularly around the circumference. The port openings 420 are thus arranged equidistantly from each other.

As can be seen in FIG. 8, the two lower port openings 420 are configured differently from the six other port openings 420. Here, for example, the six other port openings 420 have an at least substantially circular cross-section, whereas the two port openings 420 comprise an oval cross-section. Below the port opening 420, a connecting plate is configured with a fastening device, in this case a hole, at the two lower port openings 420. The two lower port openings 420 are used to be able to connect the valve device 400 directly to a heat exchanger. The two lower port openings 420 do not have to comprise a different cross-section; in the example shown in FIG. 8, this serves primarily to identify the two lower port openings 420. It is more important that the two port openings 420 for the heat exchanger are arranged directly next to each other. Also, two different fluid circuits flow through the two port openings 420. So each of the two port openings 420 is connected with its own 4/2-way valve formed by the valve device 400. Another advantage of the embodiment shown is that two valve outlets, i.e. port openings 420, can be demolded simultaneously with one slide in the injection mold.

Figure 9:
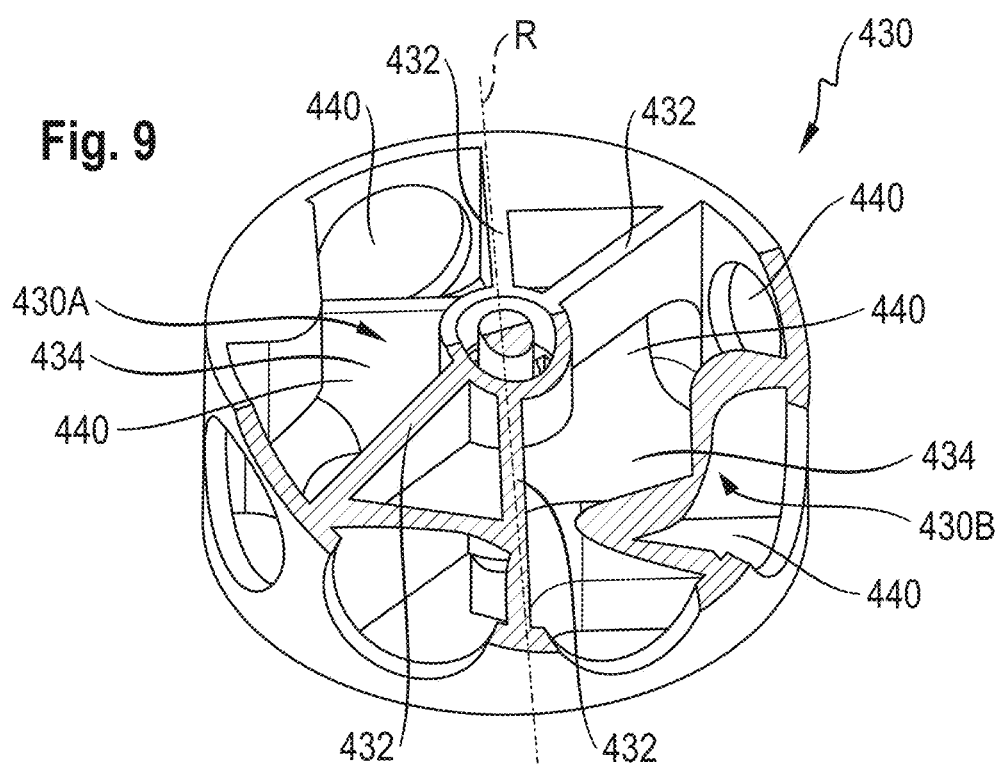
FIG. 9 a schematic illustration of the valve body of the valve device of FIG. 8.

FIG. 9 shows a schematic illustration of the valve body 430 of the valve device 400. The valve body 430 is configured as a one-piece body and, as described in particular in connection with FIG. 10, can nevertheless perform the function of two 4/2-way valves.

In FIG. 9, the axis of rotation R can be seen about which the valve body 430 can be rotated to switch the valve device 400. A dividing wall 432 is configured parallel to the axis of rotation R. The dividing wall 432 divides the valve body 430 into a first sub-region, shown here to the left of the dividing wall 432, and a second sub-region, shown here to the right of the dividing wall 432. Two of the connecting channels 440 are arranged in each sub-region 430A, 430B.

The connecting channels 440 are defined by a dividing plane 434. The dividing plane 434 divides the valve body 430 shown in FIG. 9 into an upper portion 430A and a lower portion 430B. Two upper connecting channels 400 are arranged above the dividing plane 434 and two lower connecting channels 400 are arranged below the dividing plane 434. Each of the two portions 430A, 430B is configured as a 4/2-way valve. The dividing plane 434 thus also separates the two fluid circuits of the 4/2-way valves.

The dividing plane 434 is divided into a first subplane and a second subplane. Here, the first subplane extends in the first subarea 430A and the second subplane extends in the second subarea 430B. With other words, the two subplanes are separated by means of the dividing wall 432. The subplanes are not arranged orthogonally to the axis of rotation R. This also means that the dividing plane 434 or the individual subplanes comprise an angle of inclination α relative to the port plane. The angle of inclination α is greater than 0°, smaller than 45°, preferably smaller than 30°, further preferably smaller than 15°, particularly preferably smaller than 5°. The angle of inclination α does not have to be constant in the dividing plane 434 or the individual subplanes. The dividing plane 434 can therefore comprise one or more curvatures. This also means that individual sections of the dividing plane 434 may comprise different angles of inclination α. Preferably, however, all angles in the sections of the dividing plane 434 are within the angular ranges introduced above.

The dividing plane 434 is configured axially symmetrical to the axis of rotation R. The means that the two subplanes have symmetrical angles of inclination or sections with comprise angles of inclination to each other. Alternatively, the two subplanes could also be configured mirror-symmetrically with the dividing wall 432 as a mirror plane.

Figure 10:
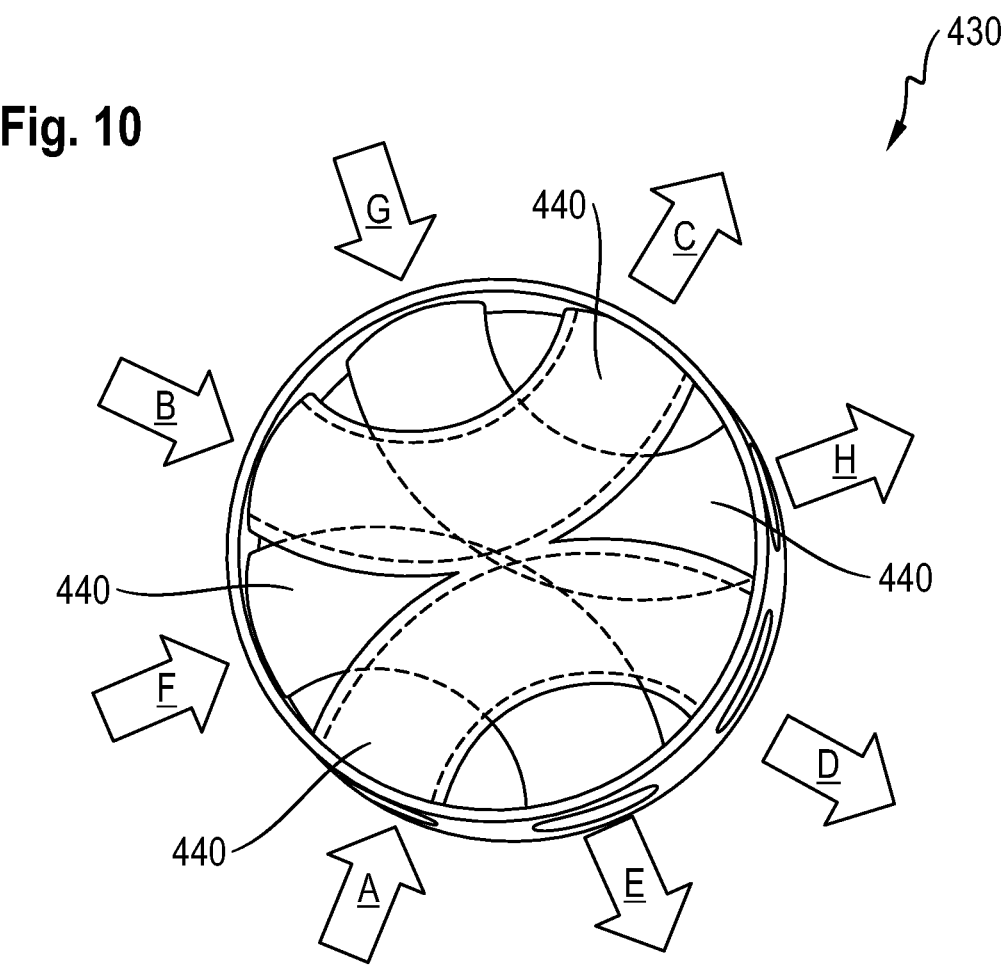
FIG. 10 a functional illustration of the valve device according to the invention.

FIG. 10 shows a functional illustration of the valve device 400 according to the invention. Thereby, the connecting channels 440 are shown in a simplified manner as arcuate shapes. The arcuate shaped channels each connect two port openings 420, wherein letters are assigned to the port openings 420 to distinguish them from each other. A further port opening 420 is arranged between each of two port openings 420 connected with the arcuate shaped channels.

As already described, the valve device 400 fulfills the function of two valve units, in particular of two 4/2-way valves. Here, the first valve unit comprises the port openings A, B, C, D and the second valve unit comprises the ports E, F, G, H.

In the position shown, the valve device 400 is in a first switching position. In this position, the port opening A is connected with the port opening D in the first valve unit. Furthermore, the port opening B is connected with the port opening C. In the second valve unit, in the same position, port opening E is connected to port opening F, and port opening G is connected to port opening H.

If the valve device 400 is switched one step further, in this case by 45° clockwise, then the valve device 400 is in a second switching position. In this case, port opening A is connected with port opening B and port opening C is connected with port opening D. Furthermore, port opening E continues to be connected with port opening F and port opening G continues to be connected with port opening H. Thus, only the switching position of the first valve unit changes.

If the valve device 400 is switched one step further, in this case by further 45° in a clockwise direction, the valve device 400 is in the third switching position. Here, port opening A is then reconnected with port opening B and port opening C is reconnected with port opening D. Furthermore, port opening E is now connected with port opening H and port opening F is now connected with port opening G.

If the valve device 400 is moved a further step, i.e. by further 45° in a clockwise direction, the valve device 400 is in the fourth switching position. Here, port opening A is then connected to port opening B again and port opening C is connected to port opening D again. Furthermore, port opening E continues to be connected with port opening H, and port opening F continues to be connected with port opening G.

At the next changeover, in this case again by 45°, the valve device 400 is again in the first switching position and switching can continue in the same sequence.

If the two valve units are configured as 4/2-way valves, as illustrated here, each of the valve units has two switching positions. When the valve device 400 is in the first position, the first valve unit is in the first switching position and the second valve unit is in the first switching position. When the valve device 400 is in the second position, the first valve unit is in the second switching position and the second valve unit is in the first switching position. When the valve device 400 is in the third position, the first valve unit is in the first switching position and the second valve unit is in the second switching position. When the valve device 400 is in the fourth position, the first valve unit is in the second switching position and the second valve unit is in the second switching position.

All features explained and shown in connection with individual embodiments of the invention may be provided in different combinations in the subject-matter according to the invention in order to simultaneously realize their advantageous effect. The scope of protection of the present invention is given by the claims and is not limited by the features explained in the description or shown in the figures.

The invention claimed is:

1. An apparatus for handling fluid within an at least partially electrically powered vehicle, comprising:
   a valve device including a valve housing, wherein the valve housing comprises eight radially arranged port openings for fluid to flow in or out; and
   a valve body, which is arranged inside the valve housing and is rotatable about an axis of rotation R, wherein the valve body includes four connecting channels, each formed to fluidly connect two port openings of the eight radially arranged port openings, respectively, a further port opening of the eight port openings is arranged between two port openings that are fluidically connected to each other, and two port openings of the eight port openings that are arranged directly next to each other and have oval cross-sections are coupled directly to a heat exchanger.

2. The apparatus according to claim 1, wherein the valve body is configured to be transferable between at least four different switching positions.

3. The apparatus according to claim 2, wherein the radially arranged port openings each include the same distance from one another.

4. The apparatus according to claim 1, wherein the radially arranged port openings each include the same distance from one another.

5. The apparatus according to claim 1, wherein the port openings are located in a common port plane and the axis of rotation R is configured orthogonal to the port plane.

6. The apparatus according to claim 1, wherein the valve body includes a dividing wall which is configured to be parallel to the axis of rotation R.

7. The apparatus according to claim 1, wherein a wet-running gearbox is associated with the valve device.

8. The apparatus according to claim 1, further comprising: an apparatus housing with a first housing section and a second housing section, wherein the first housing section and the second housing section are configured to be adjacent to each other by a fluidically impermeable contour wall, wherein the contour wall includes a side oriented toward the first housing section and a side oriented toward the second housing section, wherein the apparatus further includes at least one fluid handling element, wherein the fluid handling element includes a first element arranged in the first housing section for generating a controllably variable magnetic field, and a second element in the form of the valve device movable by the generated magnetic field and which is arranged in the second housing section.

9. The apparatus according to claim 8, wherein the first element generating a controllably variable magnetic field includes a stator and the second element movable by the generated magnetic field in the form of the valve device includes a rotor.

10. The apparatus according to claim 8, wherein the contour wall includes a cylindrical protrusion, which at least substantially fills an interior of a stator arranged in the first housing section.

11. The apparatus according to claim 10, wherein the cylindrical protrusion is configured to accommodate a rotor arranged in the second housing section.

12. The apparatus according to claim 1, wherein the apparatus includes a second fluid handling element includes a fluid pump.

13. The apparatus according to claim 1, wherein the rotor axes the fluid handling elements are arranged parallel to each other.

14. An apparatus for handling fluid within an at least partially electrically powered vehicle, comprising:
   a valve device including a valve housing, wherein the valve housing comprises eight radially arranged port openings for fluid to flow in or out; and
   a valve body, which is arranged inside the valve housing and is rotatable about an axis of rotation R,
   wherein the valve body includes four connecting channels, each connecting channel formed to fluidly connect two port openings of the eight radially arranged port openings, respectively,
   a further port opening of the eight port openings is arranged between two port openings that are fluidically connected to each other,
   two port openings of the eight port openings that are arranged directly next to each other are coupled directly to a heat exchanger, and
   the radially arranged port openings each include the same distance from one another.

* * * * *